(12) United States Patent
Dejneka et al.

(10) Patent No.: US 10,807,906 B2
(45) Date of Patent: *Oct. 20, 2020

(54) ARTICLES INCLUDING GLASS AND/OR GLASS-CERAMICS AND METHODS OF MAKING THE SAME

(71) Applicant: CORNING INCORPORATED, Corning, NY (US)

(72) Inventors: Matthew John Dejneka, Corning, NY (US); Jesse Kohl, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/404,783

(22) Filed: May 7, 2019

(65) Prior Publication Data

US 2019/0256408 A1    Aug. 22, 2019

Related U.S. Application Data

(63) Continuation of application No. 16/157,663, filed on Oct. 11, 2018, now Pat. No. 10,370,291, which is a continuation of application No. 15/840,040, filed on Dec. 13, 2017, now Pat. No. 10,246,371.

(51) Int. Cl.

| | | |
|---|---|---|
| C03C 10/02 | (2006.01) | |
| C03C 10/00 | (2006.01) | |
| C03C 3/091 | (2006.01) | |
| C03C 3/097 | (2006.01) | |
| C03C 3/093 | (2006.01) | |
| C03C 4/08 | (2006.01) | |
| C03C 3/118 | (2006.01) | |

(52) U.S. Cl.
CPC .......... *C03C 10/0054* (2013.01); *C03C 3/091* (2013.01); *C03C 3/093* (2013.01); *C03C 3/097* (2013.01); *C03C 3/118* (2013.01); *C03C 4/082* (2013.01); *C03C 4/085* (2013.01); *C03C 10/0009* (2013.01); *C03C 10/0018* (2013.01); *C03C 10/0027* (2013.01); *C03C 2204/00* (2013.01)

(58) Field of Classification Search
None
See application file for complete search history.

(56) References Cited

U.S. PATENT DOCUMENTS

| | | |
|---|---|---|
| 2,034,994 A | 3/1936 | Sharp et al. |
| 2,952,575 A | 9/1960 | Baltzer |
| 3,293,052 A | 12/1966 | Sawchuk et al. |
| 3,457,106 A | 7/1969 | Gillery |
| 3,499,775 A | 3/1970 | Turner et al. |
| 3,582,370 A | 6/1971 | Beall |
| 3,779,733 A | 12/1973 | Janakirama |
| 3,785,834 A | 1/1974 | Rapp |
| 3,985,534 A | 10/1976 | Flannery et al. |
| 4,303,298 A | 12/1981 | Yamashita |
| 4,537,862 A | 8/1985 | Francel et al. |
| 4,769,347 A | 9/1988 | Cook et al. |
| 4,792,536 A | 12/1988 | Pecoraro et al. |
| 4,870,539 A | 9/1989 | Chance et al. |
| 5,393,593 A | 2/1995 | Gulotta et al. |
| 5,468,694 A | 11/1995 | Taguchi et al. |
| 5,565,388 A | 10/1996 | Krumwiede et al. |
| 5,566,428 A | 10/1996 | Takahashi |
| 5,668,066 A | 9/1997 | Oguma et al. |
| 6,048,621 A | 4/2000 | Gallego et al. |
| 6,114,264 A | 9/2000 | Krumwiede et al. |
| 6,184,162 B1 | 2/2001 | Speit et al. |
| 6,196,027 B1 | 3/2001 | Varanasi et al. |
| 6,214,429 B1 | 4/2001 | Zou et al. |
| 6,274,523 B1 | 8/2001 | Krumwiede et al. |
| 6,376,399 B1 | 4/2002 | Aitken et al. |
| 6,537,937 B1 | 3/2003 | Nishizawa et al. |
| 6,899,954 B2 | 5/2005 | Kolberg et al. |
| 6,911,254 B2 | 6/2005 | Fisher et al. |
| 7,192,897 B2 | 3/2007 | Yamane et al. |
| 7,365,036 B2 | 4/2008 | Miyazaki et al. |
| 7,517,822 B2 | 4/2009 | Fechner et al. |
| 7,727,916 B2 | 6/2010 | Peuchert et al. |
| 7,795,164 B2 | 9/2010 | Ritzberger et al. |
| 7,820,575 B2 | 10/2010 | Nagashima et al. |
| 7,838,451 B2 | 11/2010 | Nishizawa et al. |

(Continued)

FOREIGN PATENT DOCUMENTS

| | | |
|---|---|---|
| CN | 104445932 A | 3/2015 |
| CN | 107601853 A | 1/2018 |

(Continued)

OTHER PUBLICATIONS

"How Low-E Glass Works: What is Low-E Glass." PPG Glass Education Center, <www.educationcenter.ppg.com/glasstopics/how_lowe_works.aspx <http://www.educationcenter.ppg.com/glasstopics/how_lowe_works.aspx> > retrieved on Dec. 22, 2015.

"Window Technologies: Low-E Coatings." Effiucient Windows Collaborative, <www.efficientwindows.org/lowe.php> retrieved on Dec. 22, 2015.

Lee et al; "A Study on Toughened Glass Used for Vehicles and Its Testing Methods"; 8 Pages; Date Unknown; http://www-esv.nhtsa.dot.gov/Proceedings/24/files/24ESV-000152.PDF.

Adachi et al; "Chromatic Instabilities in Cesium-Doped Tungsten Bronze Nanoparticles"; Journal of Applied Physics, 114; (2013) pp. 194304-1-194304-11.

Aitken and Youngman, "Structure-property relationships of WAI and WTi phosphate glasses and their corresponding glass-ceramics" Xi BrazGlass, Curitiba, Brazil. Jul. 15, 2017. 30 slides.

(Continued)

*Primary Examiner* — Karl E Group
(74) *Attorney, Agent, or Firm* — Russell S. Magaziner

(57) ABSTRACT

A glass-ceramic includes a silicate-containing glass and crystals within the silicate-containing glass. The crystals include non-stoichiometric tungsten and/or molybdenum sub-oxides, and the crystals are intercalated with dopant cations.

20 Claims, No Drawings

(56) References Cited

U.S. PATENT DOCUMENTS

| | | | |
|---|---|---|---|
| 7,851,394 | B2 | 12/2010 | Ellison |
| 8,017,538 | B2 | 9/2011 | Teyssedre et al. |
| 8,141,387 | B2 | 3/2012 | Letz et al. |
| 8,263,509 | B2 | 9/2012 | Hoppe et al. |
| 8,268,202 | B2 | 9/2012 | Mamak et al. |
| 10,246,371 | B1 * | 4/2019 | Dejneka ............ C03C 4/085 |
| 10,370,291 | B2 * | 8/2019 | Dejneka ............ C03C 3/091 |
| 10,450,220 | B2 * | 10/2019 | Dejneka ............ C03C 4/02 |
| 2002/0032113 | A1 | 3/2002 | Nakajima et al. |
| 2002/0072461 | A1 | 6/2002 | Akimoto et al. |
| 2002/0080474 | A1 | 6/2002 | Ohishi et al. |
| 2003/0158029 | A1 | 8/2003 | Clasen et al. |
| 2005/0181927 | A1 | 8/2005 | Hasegawa et al. |
| 2006/0025298 | A1 | 2/2006 | Emlemdi |
| 2006/0063009 | A1 | 3/2006 | Naitou et al. |
| 2007/0158317 | A1 | 7/2007 | Brix et al. |
| 2007/0225144 | A1 | 9/2007 | Miyazaki et al. |
| 2008/0193686 | A1 | 8/2008 | Loergen et al. |
| 2009/0109654 | A1 | 4/2009 | Fechner et al. |
| 2009/0215605 | A1 | 8/2009 | Letz et al. |
| 2011/0028298 | A1 | 2/2011 | Hoppe et al. |
| 2012/0247525 | A1 | 10/2012 | Aitken et al. |
| 2014/0232030 | A1 | 8/2014 | Ritzberger et al. |
| 2014/0256865 | A1 | 9/2014 | Boulton et al. |
| 2015/0093554 | A1 | 4/2015 | Estinto et al. |
| 2017/0362119 | A1 | 12/2017 | Dejneka et al. |
| 2018/0044224 | A1 | 2/2018 | Peng et al. |
| 2019/0168023 | A1 | 6/2019 | Eltorai |
| 2019/0177212 | A1 | 6/2019 | Dejneka et al. |

FOREIGN PATENT DOCUMENTS

| | | | |
|---|---|---|---|
| EP | 2581353 | A1 | 4/2013 |
| JP | 53085813 | A | 7/1978 |
| JP | 63242946 | A | 10/1988 |
| JP | 09241035 | A | 9/1997 |
| JP | 2002293571 | A | 10/2002 |
| JP | 2003099913 | A | 4/2003 |
| JP | 2004091308 | A | 3/2004 |
| JP | 2004206741 | A | 7/2004 |
| JP | 2007238353 | A | 9/2007 |
| JP | 2011046599 | A | 3/2011 |
| SU | 392016 | A1 | 12/1973 |
| WO | 9902461 | A1 | 1/1999 |
| WO | 2017129516 | A1 | 8/2017 |
| WO | 2019051408 | A2 | 3/2019 |

OTHER PUBLICATIONS

Aitken et al. "Structure-property relationships of WAI and WTi phosphate glass", NCM-13, Halifax, NS, Canada. Jul. 26, 2016. 25 slides.

Alizadeh et al; "Effect of Nucleating Agents on the Crystallization Behaviour and Microstructure of SiO2—CaO—MgO (Na2O) Glass-Ceramics"; Journal of the European Ceramic Society; 20 (2000), 775-782.

Alizadeh et al; "Study of Bulk Crystallization in MgO—CaO—SiO2—Na2O Glasses in the Prescence of CaF2 and MoO3 Nucleant"; Journal of Materials Science 38 (2003); pp. 1529-1534.

Aren et al; "Chalcopyrite CuIn(Se1-x, Sx)2 Semiconducting Thin Films", Journal of Materials Science Letters; pp. 11761177, 1993.

Automotive Sunroof Market Size Forcast to Reach USD 9.76 Billion by 2022; Published Mar. 24, 2016; Global Market Insights, Inc. 3 pages; https://www.gminsights.com/pressrelease/automotive-sunroof-market-report.

Beall and Duke, "Transparent glass ceramics", Journal of Materials Science 4 (1969), pp. 340-352.

Beecham; "Research Analysis: Infrared Reflective Glazing"; Just Auto; 2 pages 2013; http://www.just-auto.com/analysis/infrared-reflective-glazing_id140645.aspx.

Bodnar et al; "Formation and Optical Properties of CuInSe2 Nanocrystals in a Silicate Matrix", Inorganic Materials, vol. 40, No. 8, 2004, pp. 797801. Translated From Neorganicheskie Materialy, vol. 40, No. 8, 2004, pp. 915920.

Brickwedel et al; "Formation and Properties of Sodium Tungsten Borate Glasses", Phys. Chem. Glasses: Eur. J. Glass Sci. Technol. B, 5, 598 (2006).

Chen et al; "Preparation and Near-Infrared Photothermal Conversion Property of Cesium Tungsten Oxide Nanoparticles"; Nanoschale Research Letters, 8; 57; (2013); 8 Pages.

Dejneka et al; "Devices With Bleached Discrete Region and Methods of Manufacture"; Filed as U.S. Appl. No. 62/612,848 on Jan. 2, 2018; 57 Pages.

Dejneka et al; "Glass-Ceramics and Methods of Making the Same"; Filed as U.S. Appl. No. 62/598,108 on Dec. 13, 2017; 38 Pages.

Dejneka et al; "Laminate Glass Ceramic Articles With UV- and NIR-Blocking Characteristics and Methods of Making the Same"; Filed as U.S. Appl. No. 62/599,517 on Dec. 15, 2017; 50 Pages.

Dejneka et al; "Polychromatic Articles and Methods of Making the Same"; Filed as U.S. Appl. No. 62/598,194 on Dec. 13, 2017; 62 Pages.

Dejneka et al; "Tungsten Glass-Ceramics With a Sharp Cutoff Wavelength"; Filed as U.S. Appl. No. 62/575,763 on Oct. 23, 2017; 43 Pages.

Dejneka, "The luminescence and structure of novel transparent oxyfluoride glass-ceramics", Journal of Non-Crystalline Solids 239 (1998) pp. 149-155.

Dejneka, "Transparent oxyflouride glass ceramics" MRS Bulliten, Nov. 1998, pp. 57-62.

Dickens et al; "The Tungsten Bronzes and Related Compounds", J. Amer. Chem. Soc., 81, 5556 (1981).

Dutta et al. "In-situ characterization of conductive W-Ti Phosphate Glass-Ceramics" GOMD Conference, 2016, Madison, WI. 17 slides.

Ecoflo; "What are the RCRA 9 Metals?"; Downloaded Jan. 10, 2019; 4 Pages; https://www.ecoflo.com/2014/12/19/what-are-the-rcra-8-metals/.

Efficient Window Collaborative; Window Technologies: (Technologies. PHP) Low-E Coatings; Copyright 2000-2018; 8 Pages.

El-Sayed et al; "Some Properties of Sodium Tungsten Bronzes as a Function of Sodium Concentration"; Indian Journal of Chemical Technology; vol. 12, May 2005; pp. 304-308.

European Commission; "12 Lead Cadmium in Optical Glass"; (2011); 7 Pages; 2. http://rohs.exemptions.oeko.info/fileadmin/user_upload/Rohs_V/Request_12/12_Lead_Cadmium_in_Optical_Glass_2011-08-09.pdf.

Spectaris; "Exemption Renewal Reqeust Form"; 29 Pages; Date Unknown; 1. http://rohs.exemptions.oeko.info/fileadmin/user_upload/RoH_Pack_7/Exemption_13b/Spectaris_Exemption_Renewal_Request_13b_Final.pdf.

Gabuni et al; "A Study of the Process of Doping High-Aluminium-Ferruginous Glasses With Small Additions of Some Oxides"; Thesis. Leningrad, 1963; 4 Pages.

Gabuniya et al; "Study of the Process of Alloying High-Content Aluminum-Iron Glass With Small Admixtures of Various Oxides"; Ministry for the Construction Materials Industry of the Georgian SSR Scientific and Technical Association "Gruzniistrom" Tbilisi Scientific Research Institute for Construction Material; Issue IX; (1975), 7 Pages.

Green et al; "Optical Properties of Dilute Hydrogen Tungsten Bronze Thin Films"; Journal of Applied Physics, 69, (1991); pp. 7788-7796.

Green et al; "Optical Properties of Lithium Tungsten Bronze Thin Films"; Journal of Applied Physics; 74; (1993); pp. 3451-3458.

Guo et al; "Highly Efficient Ablation of Metastatic Breast Cancer Using Ammonium-Tungsten-Bronze Nanocube as a Novel 1064 NM-Laser-Driven Photothermal Agent"; Biomaterials; 52 (2015) pp. 407-416.

Hussain; "Optical and Electrochromic Properties of Annealed Lithium-Molybdenum-Bronze Thin Films"; Journal of Electronic Materials; vol. 31, No. 6, (2002) pp. 615-630.

International Search Report and Written Opinion of the International Searching Authority; PCT/US2017/037809 dated Oct. 18, 2017, 16 pgs.

(56) References Cited

OTHER PUBLICATIONS

International Search Report and Written Opinion of the International Searching Authority; PCT/US2018/057009 dated May 22, 2019, 14 pgs.
Kaliyev, "What are Tungsten Bronzes", EIR vol. 20, No. 17, Apr. 30, 1993, 2 Pages.
Kamel et al; "Effect of the Ce Content on a Nuclear Waste Glassy Matrix in the System SiO2—Al2O3—CaO—MgO—ZrO2—TiO2, Synthesized at a Low Melting Temperature"; Journal of Materials Science and Engineering, A; 3 (4) (2013) pp. 209-223.
Kawamoto et al; "Effects of Crystallization on Thermal Properties and Chemical Durability of the Glasses Containing Simulated High Level Radioactive Wastes"; Bull.Governm.Ind.Res.Inst.Osaka, 1978, vol. 29, No. 2, p. 168.
Kim et al; "Near Infrared Cut-Off Characteristics of Various Perovskite-Based Composite Films" ; IPCBEE, vol. 43 (2012); pp. 40-43.
Knoche et al; "Melt Densities for Leucogranites and Granitic Pegmatites: Partial Molar Volumes for SiO2, Al2O3, Na2O, K2O, Li2O, Rb2O, Cs2O, MgO, CaO, SrO, BaO, B2O3, P2O5, F2O-1, TiO2, Nb2O5, Ta2O5, and WO3"; Geochimica et Cosmochimica Acta, vol. 59, No. 22 (1995) pp. 4645-4652.
Miyazaki, "Fabrication of UV-opaque and visible transparent composite film", Solar Energy Materials & Solar Cells 90 (2006), pp. 2640-2646.
Moon et al; "Near Infrared Shielding Properties of Quarternary Tungsten Bronze Nanopartice NAO.11CSO.22WO3"; Bull Korean Chem. Soc. vol. 34, No. 3 (2013); pp. 731-734.
Moore et al. "Microstructural evolution of conductive WTi phosphate glass-ceramics" GOMD, Madison, WI. May 26, 2016. 18 slides.
Official Newsletter of the Committee on Inventions and Discoveries Under the Council of Lministers of the USSR 50th Publication Year; Discoveries, Inventions; Industrial Prototypes; Trade Marks; Jul. 27, 1973; 3 Pages.
Paradis et al. "Doped vanadium dioxide with enhanced infrared modulation" , Sep. 2007, Defense and Research Development Canada.
Pinet et al; "Redox Effect of Waste Containment Glass Properties: Case of a Borosilicate Glass Containing 16 WT% MoO3"; Proc. XIX Int. Congr. Glass, Eidinburgh, Jul. 1-6, 2001, Glass Technology, 2002, 43C pp. 158-161.
Poirier et al; "Redox Behavior of Molybdenum and Tungsten in Phosphate Glasses"; J. Phys. Chem. B.; 112; (2008); pp. 4481-4487.
Pricing; Metal Bulletin Historical Tungsten Pricing (Annual Mean Averages); 2 Pages; https://knoema.com/UNCTADFMCP2015Feb/free-market-commodity-prices-july-2016?tsld=1001760.
Profita et al; "What You Need to Know About Heavy Metals Pollution in Portland"; OPB; 13 Pages (2016) http://www.opb.org/news/article/what-you-need-to-know-about-heavy-metals-pollution-in-portland/.
Rouhani, "Photochromism of Molybdenum Oxude", National University of Singapore, PhD Thesis, Nus Graduate School for Integrative Sciences and Enginnering, 2013; 139 Pages.
Saflex® SG Solar Absorbing PVB, Advanced Interlayer Technology for Laminated Glass; 2015; 2 Pages; https://www.saflex.com/pdf/en/Al-Arch-009a_Saflex_SG_Solar_A4.pdf.
Saint-Gobain Thermocontrol Venus; Copyright 2013; 1 Page; http://saint-gobain-autover.com/thermocontrol-venus-for-auto-glass.

Sakka; "Formation of Tungsten Bronze and Other Electrically Conducting Crystals by Crystallization of Glasses Containing Alkali and Tungsten Oxide", Bull. Inst. Chem. ReES, Kyoto Univ., 48 [4-5], 185 (1970).
Shi et al; "Hydrothermal Systhesis of CsxWO3 and the Effects of N2 Annealing on Its Microstructure and Heat Shielding Properties", J. Mater. Sci. Technol., 30 [4], 342 (2014).
Song et al; "Hydrophilic Molybdenum Oxide Nanomaterials With Controlled Morphology and Strong Plasmonic Absorption OFR Photothermal Ablation of Cancer Cells"; ACS Appl. Mater. Interfaces, 6; (2014); pp. 3915-3922.
Tanaka et al; "Phase Separation of Borosilcate Glass With Molybdenum Oxide Addition and Pore Structure of Porous Glass"; J. Ceram. Assoc. Japn, vol. 93 [1083], 700-707 (1985).
Tawarayama et al; "Coloration and Decoloration of Tungsten Phosphate Glasses by Heat Treatments at the Temperature Far Below Tg Under a Controlled Ambient"; Chem. Mater. 2006, 18, pp. 2810-2816.
Tetchi Fabrice Achille et al. "contribution to light transmittance modelling in starch media" African Journal of Biotechnology; Mar. 5, 2007; pp. 569-575; 6(5.
Von Dirke et al; "Cluster Formation of WO3 in Li2B4O7 Glasses", J. Non Crys. Sol., 124, 265 (1990).
Wakeham et al; "Investigation of Tin-Based Alternatives for Cadmium in Optoelectronic Thin-Film Materials", Appl. Optics, 47, [13], May 2008.
Wen et al; "Water Resistance of a New Nonlead Phosphate Sealing Glass"; Phys. Chem. Glasses, 43, (3) (2002) pp. 158-160.
Zeng et al; "The Preparation of a High Performance Near-Infrared Shielding CsxWO3/SiO2 Composite Resin Coating and Research on Its Optical Stability Under Ultraviolet Illumination", J. Mater. Chem. C, 3, 8050 (2015).
Zhou et al. "CsxWO3 nanoparticle-based organic polymer transparent foils: low haze, high near-infrared sheilding ability and excellent photocromic stability" Journal of Materials Chemistry 5, C, 2017, pp. 6251-6258.
http://cars.axlegeeks.com/d/x/Panorama-Sunroof.
http://www.wsj.com/articles/SB10001424127887324024004578173271481039256.
Banlaw; Molybdenum Prices and Molybdenum Price Charts; IPCC; http://www.infomine.com/Investment/metal-prices/molybdenum-oxide/.
GL-20, PPG Industires, Inc; http://www.pgwglass.com/products/Pages/OEMgVistaGrayGL-20.aspx.
Low-E Glass; Blending Natural Views With Solar Efficiency; http://www.ppgideascapes.com/Glass/Products/Low-E-Glass.aspx.
Motortrend; From Coupes to Wagons, Some Cars Less Than $50,000 Have an Extra-Large Sunroof; 33 Pages; Date Unknown; http://www.motortrend.com/news/vehicles-offering-panoramic-sunroofs-for-less-than-50000/.
Solar Energy Spectrum; 1 Page; Date Unknown; http://educationcenter.ppg.com/images/glasstopics/LOW-E%20COATING%201.jpg.
Solar Energy Spectrum; 1 Page; Date Unknown; https://www.saflex.com/pdf/en/sseriesproductbrochure.pdf.
Sunroof; Wikipedia; Last Updated Nov. 9, 2017; 2 Pages; https://en.wikipedia.org/wiki/Sunroof.
Vitro "Radio and Microwave Frequency Attenuation in Glass", PPG Glass Technical Document, TD-151, PPG Industries Inc. (Updated Oct. 4, 2016 to Vitro Logo and Format).

* cited by examiner

ARTICLES INCLUDING GLASS AND/OR GLASS-CERAMICS AND METHODS OF MAKING THE SAME

CROSS-REFERENCE TO RELATED APPLICATIONS

This application is a continuation of U.S. patent application Ser. No. 16/157,663 filed on Oct. 11, 2018, which issued on Aug. 6, 2019 as U.S. Pat. No. 10,370,291 and which is a continuation of U.S. patent application Ser. No. 15/840,040 filed on Dec. 13, 2017, which issued on Apr. 2, 2019 as U.S. Pat. No. 10,246,371, the contents of which is relied upon and incorporated herein by reference in its entirety, and the benefit of priority under 35 U.S.C. § 120 is hereby claimed.

FIELD OF THE DISCLOSURE

The present disclosure generally relates to articles including glasses and/or glass-ceramics, and more specifically, to compositions and methods of forming such articles.

BACKGROUND

Ultraviolet ("UV") and near-infrared ("NIR") absorbing alkali containing silicate glass-ceramics are a class of glass-ceramics which exhibit optical properties dependent on the wavelength of light which is incident on the glass-ceramics. Conventional UV/IR-blocking glasses (with low or high visible transmittance) are formed by introducing certain cationic species (e.g., $Fe^{2+}$ to absorb NIR wavelengths and $Fe_2^{3+}$ to absorb UV wavelengths, and other dopants such as Co, Ni, and Se to modify the visible transmittance) which are bonded with the glass network. Traditionally, these glass-ceramics were produced by melting the constituents together to form a glass, followed by the in situ formation of submicron precipitates through a post-formation heat treatment to form the glass-ceramic. These submicroscopic precipitates (e.g., tungstate- and molybdate-containing crystals) are absorptive of wavelength bands of light giving the glass-ceramic its optical properties. Such conventional glass-ceramics could be produced in both transparent as well as opalized forms.

Conventional tungsten and molybdenum alkali containing silicate glasses were believed to be bound to a specific and narrow composition range in order to produce glasses and glass-ceramics that are transparent at visible wavelengths. The believed composition range was based on a perceived solubility limit of tungsten oxide within peralkaline glass. For example, when batched and melted in a conventional manner, tungsten oxide can react with alkali metal oxides in the batch to form a dense alkali tungstate liquid at a low temperature during the initial stages of the melt immediately after being put into a melting furnace (e.g., the reaction occurs at about 500° C.). Because of the high density of this phase, it rapidly segregates at the bottom of the crucible. At significantly higher temperatures (e.g., above about 1000° C.), silicate constituents start to melt, and because of the silicate constituents' lower density, it remains atop the alkali tungstate liquid. The difference in densities of the constituents results in a stratification of the different liquids which gives the appearance to those skilled in the art of an immiscibility with one another This effect was observed particularly when $R_2O$ (e.g., $Li_2O$, $Na_2O$, $K_2O$, $Rb_2O$, $Cs_2O$) minus $Al_2O_3$ was about 0 mol % or greater. The resulting apparent liquid immiscibility at melting temperature resulted in a tungsten-rich phase segregating and crystallizing as it cooled which manifested itself as an opalized, non-transparent, crystal. This issue was also present with molybdenum containing melts.

Those having ordinary skill in the art observed the tungsten- and/or molybdenum-rich phase separate from the silicate rich phase, they perceived a solubility limit of tungsten and/or molybdenum (e.g., about 2.5 mol %) within the silicate rich phase. The perceived solubility limit prevented the glass from ever becoming super-saturated with tungsten or molybdenum oxides, thereby preventing either constituent from being controllably precipitated through post-forming heat-treatment to produce a glass-ceramic with a crystalline phase including these elements. Thus, the perceived solubility prevented the development of glass-ceramic compositions which achieved a sufficient quantity of solubilized tungsten and/or molybdenum to allow the formation of tungsten and/or molybdenum containing wavelength dependent submicroscopic crystals through subsequent heat treatment.

In view of these limitations, there is a need for new compositions and methods of making them that facilitate improved near infrared and ultraviolet blocking (e.g., through higher tungsten and molybdenum solubility).

SUMMARY OF THE DISCLOSURE

It has been discovered that a homogenous single-phase W or Mo-containing peralkaline melt may be obtained through the use of "bound" alkalis as described herein. Exemplary bound alkalis may include feldspar, nepheline, borax, spodumene, other sodium or potassium feldspars, alkali-aluminum-silicates and/or other naturally occurring and artificially created minerals containing an alkali and one or more aluminum and/or silicon atoms. By introducing the alkali in the bound form, the alkalis may not react with the W or Mo present in the melt to form the dense alkali tungstate and/or alkali molybdate liquid. Moreover, this change in batch material may allow the melting of strongly peralkaline compositions (e.g., $R_2O$—$Al_2O_3$=about 2.0 mol % or more) without the formation of any alkali tungstate and/or alkali molybdate second phase. This has also allowed melt temperature and mixing method to be varied and still produce a single-phase homogenous glass.

According to at least one feature of the present disclosure, an article includes (a) a glass. The glass includes $SiO_2$ from about 25 mol % to about 99 mol %, $Al_2O_3$ from about 0 mol % to about 50 mol %, $WO_3$ plus $MoO_3$ from about 0.35 mol % to about 30 mol %, and $R_2O$ from about 0.1 mol % to about 50 mol %. $R_2O$ is one or more of $Li_2O$, $Na_2O$, $K_2O$, $Rb_2O$ and $Cs_2O$. $R_2O$ minus $Al_2O_3$ is from about −35 mol % to about 7 mol %. The glass includes at least one of: (i) RO from about 0.02 mol % to about 50 mol % and (ii) $SnO_2$ is from about 0.01 mol % to about 5 mol %. RO is one or more of MgO, CaO, SrO, BaO and ZnO. If $WO_3$ is from about 1 mol % to about 30 mol %, the glass further includes $Fe_2O_3$ of about 0.9 mol % or less or $SiO_2$ is from about 60 mol % to about 99 mol %. If $WO_3$ is from about 0.35 mol % to about 1 mol %, the glass includes $SnO_2$ from about 0.01 mol % to about 5.0 mol %. If $MoO_3$ is from about 1 mol % to about 30 mol %, $SiO_2$ is from about 61 mol % to about 99 mol % or $Fe_2O_3$ is about 0.4 mol % or less and $R_2O$ is greater than RO. If $MoO_3$ is from about 0.9 mol % to about 30% and $SiO_2$ is from about 30 mol % to about 99 mol %, the glass further includes $SnO_2$ from about 0.01 mol % to about 5 mol %. The article may include (b) an inorganic glass-ceramic. The glass-ceramic includes at least one amorphous phase and one crystalline phase. $SiO_2$ is from about 1 mol % to about 95 mol %. The crystalline phase comprises an oxide, from about 0.1 mol % to about 100 mol % of the crystalline phase, of at least one of: (i) W, (ii) Mo, (iii) V and an alkali metal cation, and (iv) Ti and an alkali metal cation.

According to another feature of the present disclosure, an article includes $SiO_2$ from about 25 mol % to about 99 mol %, $Al_2O_3$ from about 0 mol % to about 50 mol %, $WO_3$ plus $MoO_3$ from about 0.35 mol % to about 30 mol %, and $R_2O$ from about 0.1 mol % to about 50 mol %. $R_2O$ is one or more of $Li_2O$, $Na_2O$, $K_2O$, $Rb_2O$ and $Cs_2O$. $R_2O$ minus $Al_2O_3$ is from about −35 mol % to about 7 mol %. The glass includes at least one of: (i) RO from about 0.02 mol % to about 50 mol % and (ii) $SnO_2$ is from about 0.01 mol % to about 5 mol %. RO is one or more of MgO, CaO, SrO, BaO and ZnO. If $WO_3$ is from about 1 mol % to about 30 mol %, the glass further includes $Fe_2O_3$ of about 0.9 mol % or less or $SiO_2$ is from about 60 mol % to about 99 mol %. If $WO_3$ is from about 0.35 mol % to about 1 mol %, the glass includes $SnO_2$ from about 0.01 mol % to about 5.0 mol %. If $MoO_3$ is from about 1 mol % to about 30 mol %, $SiO_2$ is from about 61 mol % to about 99 mol % or $Fe_2O_3$ is about 0.4 mol % or less and $R_2O$ is greater than RO. If $MoO_3$ is from about 0.9 mol % to about 30% and $SiO_2$ is from about 30 mol % to about 99 mol %, the glass further includes $SnO_2$ from about 0.01 mol % to about 5 mol %.

According to another feature of the present disclosure, the article includes at least one amorphous phase and one crystalline phase. $SiO_2$ is from about 1 mol % to about 95 mol %. The crystalline phase comprises an oxide, from about 0.1 mol % to about 100 mol % of the crystalline phase, of at least one of: (i) W, (ii) Mo, (iii) V and an alkali metal cation, and (iv) Ti and an alkali metal cation.

According to a first aspect, an article includes (a) a glass. The glass includes $SiO_2$ from about 25 mol % to about 99 mol %, $Al_2O_3$ from about 0 mol % to about 50 mol %, $WO_3$ plus $MoO_3$ from about 0.35 mol % to about 30 mol %, and $R_2O$ from about 0.1 mol % to about 50 mol %. $R_2O$ is one or more of $Li_2O$, $Na_2O$, $K_2O$, $Rb_2O$ and $Cs_2O$. $R_2O$ minus $Al_2O_3$ is from about −35 mol % to about 7 mol %. The glass includes at least one of: (i) RO from about 0.02 mol % to about 50 mol % and (ii) $SnO_2$ is from about 0.01 mol % to about 5 mol %. RO is one or more of MgO, CaO, SrO, BaO and ZnO. If $WO_3$ is from about 1 mol % to about 30 mol %, the glass further includes $Fe_2O_3$ of about 0.9 mol % or less or $SiO_2$ is from about 60 mol % to about 99 mol %. If $WO_3$ is from about 0.35 mol % to about 1 mol %, the glass includes $SnO_2$ from about 0.01 mol % to about 5.0 mol %. If $MoO_3$ is from about 1 mol % to about 30 mol %, $SiO_2$ is from about 61 mol % to about 99 mol % or $Fe_2O_3$ is about 0.4 mol % or less and $R_2O$ is greater than RO. If $MoO_3$ is from about 0.9 mol % to about 30% and $SiO_2$ is from about 30 mol % to about 99 mol %, the glass further includes $SnO_2$ from about 0.01 mol % to about 5 mol %. The article may include (b) an inorganic glass-ceramic. The glass-ceramic includes at least one amorphous phase and one crystalline phase. $SiO_2$ is from about 1 mol % to about 95 mol %. The crystalline phase comprises an oxide, from about 0.1 mol % to about 100 mol % of the crystalline phase, of at least one of: (i) W, (ii) Mo, (iii) V and an alkali metal cation, and (iv) Ti and an alkali metal cation.

According to a second aspect, an article includes $SiO_2$ from about 25 mol % to about 99 mol %, $Al_2O_3$ from about 0 mol % to about 50 mol %, $WO_3$ plus $MoO_3$ from about 0.35 mol % to about 30 mol %, and $R_2O$ from about 0.1 mol % to about 50 mol %. $R_2O$ is one or more of $Li_2O$, $Na_2O$, $K_2O$, $Rb_2O$ and $Cs_2O$. $R_2O$ minus $Al_2O_3$ is from about −35 mol % to about 7 mol %. The glass includes at least one of: (i) RO from about 0.02 mol % to about 50 mol % and (ii) $SnO_2$ is from about 0.01 mol % to about 5 mol %. RO is one or more of MgO, CaO, SrO, BaO and ZnO. If $WO_3$ is from about 1 mol % to about 30 mol %, the glass further includes $Fe_2O_3$ of about 0.9 mol % or less or $SiO_2$ is from about 60 mol % to about 99 mol %. If $WO_3$ is from about 0.35 mol % to about 1 mol %, the glass includes $SnO_2$ from about 0.01 mol % to about 5.0 mol %. If $MoO_3$ is from about 1 mol % to about 30 mol %, $SiO_2$ is from about 61 mol % to about 99 mol % or $Fe_2O_3$ is about 0.4 mol % or less and $R_2O$ is greater than RO. If $MoO_3$ is from about 0.9 mol % to about 30% and $SiO_2$ is from about 30 mol % to about 99 mol %, the glass further includes $SnO_2$ from about 0.01 mol % to about 5 mol %.

According to a third aspect, the article of aspect 2 further comprises $B_2O_3$ from about 2.0 mol % to about 40 mol %, wherein $SiO_2$ is from about 45 mol % to about 80 mol % and $Al_2O_3$ is from about 0.5 mol % to about 15 mol %.

According to a fourth aspect, the article of aspect 3 is provided, wherein $R_2O$ is from about 0 mol % to about 14 mol % and RO is from about 0 mol % to about 1 mol %.

According to a fifth aspect, the article of aspect 4 is provided, wherein $MoO_3$ is about 0 mol % and $WO_3$ is from about 1.0 mol % to about 17 mol %

According to a sixth aspect, the article of aspect 4 is provided, wherein $SnO_2$ is from about 0.01 mol % to about 0.4 mol %.

According to a seventh aspect, the article of aspect 4 is provided, wherein $Fe_2O_3$ is from about 0 mol % to about 0.2 mol %.

According to an eighth aspect, the article of aspect 2 further comprises $B_2O_3$ from about 5 mol % to about 20 mol %, wherein $SiO_2$ is from about 55 mol % to about 75 mol % and $Al_2O_3$ is from about 8 mol % to about 12 mol %.

According to a ninth aspect, the article of aspect 8 is provided, wherein $R_2O$ is from about 3 mol % to about 14 mol % and RO is from about 0.5 mol % to about 4.5 mol %.

According to a tenth aspect, the article of aspect 9 is provided, wherein $WO_3$ is from about 1.9 mol % to about 10 mol %.

According to an eleventh aspect, the article of aspect 10 is provided, wherein $MoO_3$ is from about 0 mol % to about 1.0 mol %.

According to a twelfth aspect, the article of aspect 2 further comprises $B_2O_3$ from about 4 mol % to about 35 mol %, wherein $SiO_2$ is from about 55 mol % to about 75 mol % and $Al_2O_3$ is from about 9 mol % to about 14 mol %.

According to a thirteenth aspect, the article of aspect 12 is provided, wherein $R_2O$ is from about 2.9 mol % to about 12.2 mol % and RO is from about 0.01 mol % to about 0.5 mol %.

According to a fourteenth aspect, the article of aspect 13 is provided, wherein $MoO_3$ is from about 0 mol % to about 8.2 mol % and $WO_3$ is from about 0 mol % to about 9 mol %.

According to a fifteenth aspect, the article of aspect 14 is provided, wherein $SnO_2$ is from about 0.04 mol % to about 0.4 mol %.

According to a sixteenth aspect, the article of aspect 14 is provided, wherein $Fe_2O_3$ is from about 0 mol % to about 0.2 mol %.

According to a seventeenth aspect, the article of aspect 14 is provided, wherein $V_2O_5$ is from about 0 mol % to about 0.4 mol %.

According to an eighteenth aspect, the article of aspect 2 further comprises $B_2O_3$ from about 5 mol % to about 25 mol %, wherein $SiO_2$ is from about 50 mol % to about 75 mol % and $Al_2O_3$ is from about 7 mol % to about 14 mol %.

According to a nineteenth aspect, the article of aspect 18 is provided, wherein $R_2O$ is from about 5 mol % to about 14 mol % and RO is from about 0.02 mol % to about 0.5 mol %.

According to a twentieth aspect, the article of aspect 19 is provided, wherein $MoO_3$ is from about 1.9 mol % to about 12.1 mol % and $WO_3$ is from about 1.7 mol % to about 12 mol %.

According to a twenty-first aspect, the article of aspect 20 further comprises, at least one of Ag from about 0.01 mol % to about 0.75 mol %, Au from about 0.01 mol % to about 0.5 mol %, $V_2O_5$ from about 0.01 mol % to about 0.03 mol %, and CuO from about 0.01 mol % to about 0.75 mol %.

According to a twenty-second aspect, the article of aspect 20 is provided, wherein $SnO_2$ is from about 0.01 mol % to about 0.5 mol %.

According to a twenty-third aspect, the article of aspect 2 further comprises $B_2O_3$ from about 10 mol % to about 20 mol %, wherein $SiO_2$ is from about 60 mol % to about 78 mol %, and $Al_2O_3$ is from about 0.3 mol % to about 10 mol %.

According to a twenty-fourth aspect, the article of aspect 23 is provided, wherein $R_2O$ is from about 0.6 mol % to about 10 mol % and RO is about 0.02 mol %.

According to a twenty-fifth aspect, the article of aspect 24 is provided, wherein $MoO_3$ is about 0 mol % and $WO_3$ is from about 1.0 mol % to about 7.0 mol %.

According to a twenty-sixth aspect, the article includes at least one amorphous phase and one crystalline phase. $SiO_2$ is from about 1 mol % to about 95 mol %. The crystalline phase includes an oxide, from about 0.1 mol % to about 100 mol % of the crystalline phase, of at least one of: (i) W, (ii) Mo, (iii) V and an alkali metal cation, and (iv) Ti and an alkali metal cation.

According to a twenty-seventh aspect, the article of aspect 26 is provided, wherein the crystalline phase is substantially homogenously distributed within the glass-ceramic article as a plurality of precipitates.

According to a twenty-eighth aspect, the article of aspect 26 is provided, wherein the precipitates are positioned at a depth of greater than about 10 μm from a surface of the article.

According to a twenty-ninth aspect, the article of aspect 26 is provided, wherein the crystalline phase includes a plurality of precipitates having a length of from about 1 nm to about 500 nm as measured by Electron Microscopy.

According to a thirtieth aspect, the article of aspect 26 further includes $WO_3$ plus $MoO_3$ from about 0.35 mol % to about 30 mol %, $Al_2O_3$ from about 0 mol % to about 50 mol %, and $R_2O$ from about 0.1 mol % to about 50 mol %, wherein $R_2O$ is one or more of $Li_2O$, $Na_2O$, $K_2O$, $Rb_2O$ and $Cs_2O$, further wherein $R_2O$ minus $Al_2O_3$ is from about −35 mol % to about 7 mol %.

These and other features, advantages, and objects of the present disclosure will be further understood and appreciated by those skilled in the art by reference to the following specification, claims, and appended drawings.

DETAILED DESCRIPTION

Additional features and advantages of the invention will be set forth in the detailed description which follows and will be apparent to those skilled in the art from the description, or recognized by practicing the invention as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

It will be understood by one having ordinary skill in the art that construction of the described disclosure, and other components, is not limited to any specific material. Other exemplary embodiments of the disclosure disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

Unless otherwise specified, all compositions are expressed in terms of as-batched mole percent (mol %). As will be understood by those having ordinary skill in the art, various melt constituents (e.g., fluorine, alkali metals, boron, etc.) may be subject to different levels of volatilization (e.g., as a function of vapor pressure, melt time and/or melt temperature) during melting of the constituents. As such, the term "about," in relation to such constituents, is intended to encompass values within about 0.2 mol % when measuring final articles as compared to the as-batched compositions provided herein. With the forgoing in mind, substantial compositional equivalence between final articles and as-batched compositions is expected.

For purposes of this disclosure, the terms "bulk," "bulk composition" and/or "overall compositions" are intended to include the overall composition of the entire article, which may be differentiated from a "local composition" or "localized composition" which may differ from the bulk composition owing to the formation of crystalline and/or ceramic phases.

As also used herein, the terms "article," "glass-article," "ceramic-article," "glass-ceramics," "glass elements," "glass-ceramic article" and "glass-ceramic articles" may be used interchangeably, and in their broadest sense, to include any object made wholly or partly of glass and/or glass-ceramic material.

As used herein, a "glass state" refers to an inorganic amorphous phase material within the articles of the disclosure that is a product of fusion that has cooled to a rigid condition without crystallizing. As used herein, a "glass-ceramic state" refers to an inorganic material within the articles of the disclosure which includes both the glass state and a "crystalline phase" and/or "crystalline precipitates" as described herein.

Coefficients of thermal expansion (CTE) are expressed in terms of $10^{-7}/°$ C. and represent a value measured over a temperature range from about 0° C. to about 300° C. unless otherwise specified.

As used herein, "transmission" and "transmittance" refer to external transmission or transmittance, which takes absorption, scattering and reflection into consideration. Fresnel reflection is not factored out of the transmission and transmittance values reported herein.

As also used herein, the term "[constituent]-free [glass or glass-ceramic]" (e.g., "cadmium and selenium-free glass-ceramic"), is indicative of a glass or a glass-ceramic that is completely free, or substantially free (i.e., <500 ppm), of the listed constituent(s) and is prepared such that the listed constituent(s) are not actively, intentionally or purposefully added or batched into the glass or glass-ceramic.

As also used herein, the terms "sharp cutoff wavelength" and "cutoff wavelength" are used interchangeably and refer to a cutoff wavelength within a range of about 350 nm to 800 nm in which the glass-ceramic has a substantially higher transmittance above the cutoff wavelength ($\lambda_c$) in comparison to its transmittance below the cutoff wavelength ($\lambda_c$). The cutoff wavelength ($\lambda_c$) is the wavelength at the midpoint between an "absorption limit wavelength" and a "high transmittance limit wavelength" in the given spectra for the glass-ceramic. The "absorption limit wavelength" is specified as the wavelength in which the transmittance is 5%; and in the "high transmittance wavelength" is defined as the wavelength in which the transmittance is 72%. It will be understood that a "sharp UV cutoff" as used herein may be a sharp cutoff wavelength of cutoff wavelength as described above which occurs within the ultraviolet band of the electromagnetic spectrum.

Articles of the present disclosure are composed of glass and/or glass-ceramics having one or more of the compositions outlined herein. The article can be employed in any number of applications. For example, the article can be employed in the form of substrates, elements, lenses, covers and/or other elements in any number of optics related and/or aesthetic applications.

The article is formed from an as-batched composition and is cast in a glass state. The article may later be annealed and/or thermally processed (e.g., heat treated) to form a glass-ceramic state having a plurality of ceramic or crystalline particles. It will be understood that depending on the casting technique employed, the article may readily crystallize and become a glass-ceramic without additional heat treatment (e.g., essentially be cast into the glass-ceramic state). In examples where a post-forming thermal processing is employed, a portion, a majority, substantially all or all of the article may be converted from the glass state to the glass-ceramic state. As such, although compositions of the article may be described in connection with the glass state and/or the glass-ceramic state, the bulk composition of the article may remain substantially unaltered when converted between the glass and glass-ceramic states, despite localized portions of the article have a different compositions (i.e., owing to the formation of the ceramic or crystalline precipitates).

According to various examples, the article may include $Al_2O_3$, $SiO_2$, $B_2O_3$, $WO_3$, $MO_3$, $R_2O$ where $R_2O$ is one or more of $Li_2O$, $Na_2O$, $K_2O$, $Rb_2O$ and $Cs_2O$, RO where RO is one or more of MgO, CaO, SrO, BaO and ZnO and a number of dopants. It will be understood that a number of other constituents (e.g., F, As, Sb, Ti, P, Ce, Eu, La, Cl, Br, etc.) without departing from the teachings provided herein.

According to a first example, the article may include $SiO_2$ from about 58.8 mol % to about 77.58 mol %, $Al_2O_3$ from about 0.66 mol % to about 13.69 mol %, $B_2O_3$ from about 4.42 mol % to about 27 mol %, $R_2O$ from about 0 mol % to about 13.84 mol %, RO from about 0 mol % to about 0.98 mol %, $WO_3$ from about 1.0 mol % to about 13.24 mol % and $SnO_2$ from about 0 mol % to about 0.4 mol %. Such examples of the article may be generally related to Examples 1-109 of Table 1.

According to a second example, the article may include $SiO_2$ from about 65.43 mol % to about 66.7 mol %, $Al_2O_3$ from about 9.6 mol % to about 9.98 mol %, $B_2O_3$ from about 9.41 mol % to about 10.56 mol %, $R_2O$ from about 6.47 mol % to about 9.51 mol %, RO from about 0.96 mol % to about 3.85 mol %, $WO_3$ from about 1.92 mol % to about 3.85 mol %, $MoO_3$ from about 0 mol % to about 1.92 mol % and $SnO_2$ from about 0 mol % to about 0.1 mol %. Such examples of the article may be generally related to Examples 110-122 of Table 2.

According to a third example, the article may include $SiO_2$ from about 60.15 mol % to about 67.29 mol %, $Al_2O_3$ from about 9.0 mol % to about 13.96 mol %, $B_2O_3$ from about 4.69 mol % to about 20 mol %, $R_2O$ from about 2.99 mol % to about 12.15 mol %, RO from about 0.00 mol % to about 0.14 mol %, $WO_3$ from about 0 mol % to about 7.03 mol %, $MoO_3$ from about 0 mol % to about 8.18 mol %, $SnO_2$ from about 0.05 mol % to about 0.15 mol % and $V_2O_5$ from about 0 mol % to about 0.34 mol %. Such examples of the article may be generally related to Examples 123-157 of Table 3.

According to a fourth example, the article may include $SiO_2$ from about 54.01 mol % to about 67.66 mol %, $Al_2O_3$ from about 9.55 mol % to about 11.42 mol %, $B_2O_3$ from about 9.36 mol % to about 15.34 mol %, $R_2O$ from about 9.79 mol % to about 13.72 mol %, RO from about 0.00 mol % to about 0.22 mol %, $WO_3$ from about 1.74 mol % to about 4.48 mol %, $MoO_3$ from about 0 mol % to about 1.91 mol %, $SnO_2$ from about 0.0 mol % to about 0.21 mol %, $V_2O_5$ from about 0 mol % to about 0.03 mol %, Ag from about 0 mol % to about 0.48 mol % and Au from about 0 mol % to about 0.01 mol %. Such examples of the article may be generally related to Examples 158-311 of Table 4.

According to a fifth example, the article may include $SiO_2$ from about 60.01 mol % to about 77.94 mol %, $Al_2O_3$ from about 0.3 mol % to about 10.00 mol %, $B_2O_3$ from about 10 mol % to about 20 mol %, $R_2O$ from about 0.66 mol % to about 10 mol %, $WO_3$ from about 1.0 mol % to about 6.6 mol % and $SnO_2$ from about 0.0 mol % to about 0.1 mol %. Such examples of the article may be generally related to Examples 312-328 of Table 5.

The article may have from about 1 mol % to about 99 mol % $SiO_2$, or from about 1 mol % to about 95 mol % $SiO_2$, or from about 45 mol % to about 80 mol % $SiO_2$, or from about 60 mol % to about 99 mol % $SiO_2$, or from about 61 mol % to about 99 mol % $SiO_2$, or from about 30 mol % to about 99 mol % $SiO_2$, or from about 58 mol % to about 78 mol % $SiO_2$, or from about 55 mol % to about 75 mol % $SiO_2$, or from about 50 mol % to about 75 mol % $SiO_2$, or from about 54 mol % to about 68 mol % $SiO_2$, or from about 60 mol % to about 78 mol % $SiO_2$, or from about 65 mol % to about 67 mol % $SiO_2$, or from about 60 mol % to about 68 mol % $SiO_2$, or from about 56 mol % to about 72 mol % $SiO_2$, or from about 60 mol % to about 70 mol % $SiO_2$. It will be understood that any and all values and ranges between the above noted ranges of $SiO_2$ are contemplated. $SiO_2$ may serve as the primary glass-forming oxide and affect the stability, resistance to devitrification and/or viscosity of the article.

The article may include from about 0 mol % to about 50 mol % $Al_2O_3$, or from about 0.5 ml % to about 20 mol % $Al_2O_3$, or from about 0.5 mol % to about 15 mol % $Al_2O_3$, or from about 7 mol % to about 15 mol % $Al_2O_3$, or from about 0.6 mol % to about 17 mol % $Al_2O_3$, or from about 0.6 mol % to about 14 mol % $Al_2O_3$, or from about 7 mol % to about 14 mol % $Al_2O_3$, or from about 9.5 mol % to about 10 mol % $Al_2O_3$, or from about 9 mol % to about 14 mol % $Al_2O_3$, about 9.5 mol % to about 11.5 mol % $Al_2O_3$, or from about 0.3 mol % to about 10 mol % $Al_2O_3$, or from about 0.3 mol % to about 15 mol % $Al_2O_3$, or from about 2 mol % to about 16 mol % $Al_2O_3$, or from about 5 mol % to about 12 mol % $Al_2O_3$, or from about 8 mol % to about 12 mol % $Al_2O_3$, or from about 5 mol % to about 10 mol % $Al_2O_3$. It will be understood that any and all values and ranges between the above noted ranges of $Al_2O_3$ are contemplated. $Al_2O_3$ may function as a conditional network former and contributes to a stable article with low CTE, article rigidity, and to facilitate melting and/or forming.

The article may include $WO_3$ and/or $MoO_3$. For example, $WO_3$ plus $MoO_3$ may be from about 0.35 mol % to about 30 mol %. $MoO_3$ may be about 0 mol % and $WO_3$ is from about 1.0 mol % to about 20 mol %, or $MoO_3$ may be about 0 mol % and $WO_3$ is from about 1.0 mol % to about 14 mol %, or $MoO_3$ is from about 0 mol % to about 8.2 mol % and $WO_3$ is from about 0 mol % to about 16 mol %, or $MoO_3$ is from about 0 mol % to about 8.2 mol % and $WO_3$ is from about 0 mol % to about 9 mol %, or $MoO_3$ is from about 1.9 mol % to about 12.1 mol % and $WO_3$ is from about 1.7 mol % to about 12 mol %, or $MoO_3$ is from about 0 mol % to about 8.2 mol % and $WO_3$ is from about 0 mol % to about 7.1 mol %, or $MoO_3$ is from about 1.9 mol % to about 12.1 mol % and $WO_3$ is from about 1.7 mol % to about 4.5 mol %, or $MoO_3$ is about 0 mol % and $WO_3$ is from about 1.0 mol % to about 7.0 mol %. With respect to $MoO_3$, the glass composition may have from about 0.35 mol % to about 30 mol % $MoO_3$, or from about 1 mol % to about 30 mol % $MoO_3$, or from about 0.9 mol % to about 30% $MoO_3$, or from about 0.9 mol % to about 20% $MoO_3$, or from about 0 mol % to about 1.0 mol % $MoO_3$, or from about 0 mol % to about 0.2 mol % $MoO_3$. With respect to $WO_3$, the glass composition may have from about 0.35 mol % to about 30 mol % $WO_3$, or from about 1 mol % to about 30 mol % $WO_3$, or from about 1 mol % to about 17 mol % $WO_3$, or from about 1.9 mol % to about 10 mol % $WO_3$, or from about 0.35 mol % to about 1 mol % $WO_3$, or from about 1.9 mol % to about 3.9 mol % $WO_3$, or from about 2 mol % to about 15 mol % $WO_3$, or from about 4 mol % to about 10 mol % of $WO_3$, or from about 5 mol % to about 7 mol % $WO_3$. It will be understood that any and all values and ranges between the above noted ranges of $WO_3$ and/or $MoO_3$ are contemplated.

The article may include from about 2 mol % to about 40 mol % of $B_2O_3$, or from about 4 mol % to about 40 mol % of $B_2O_3$, or from about 4.0 mol % to about 35 mol % $B_2O_3$, or from about 4.0 mol % to about 27 mol % $B_2O_3$, or from about 5.0 mol % to about 25 mol % $B_2O_3$, or from about 9.4 mol % to about 10.6 mol % $B_2O_3$, or from about 5 mol % to about 20 mol % $B_2O_3$, or from about 4.6 mol % to about 20 mol % $B_2O_3$, or from about 9.3 mol % to about 15.5 mol % $B_2O_3$, or from about 10 mol % to about 20 mol % $B_2O_3$, or from about 10 mol % to about 25 mol % $B_2O_3$. It will be understood that any and all values and ranges between the above noted ranges of $B_2O_3$ are contemplated. $B_2O_3$ may be a glass-forming oxide that is used to reduce CTE, density, and viscosity making the article easier to melt and form at low temperatures.

The article may include at least one alkali metal oxide. The alkali metal oxide may be represented by the chemical formula $R_2O$ where $R_2O$ is one or more of $Li_2O$, $Na_2O$, $K_2O$, $Rb_2O$, $Cs_2O$ and/or combinations thereof. The article may have an alkali metal oxide composition of from about 0.1 mol % to about 50 mol % $R_2O$, or from about 0 mol % to about 14 mol % $R_2O$, or from about 3 mol % to about 14 mol % $R_2O$, or from about 5 mol % to about 14 mol % $R_2O$, or from about 6.4 mol % to about 9.6 mol % $R_2O$, or from about 2.9 mol % to about 12.2 mol % $R_2O$, or from about 9.7 mol % to about 12.8 mol % $R_2O$, or from about 0.6 mol % to about 10 mol % $R_2O$, or from about 0 mol % to about 15 mol % $R_2O$, or from about 3 mol % to about 12 mol % $R_2O$, or from about 7 mol % to about 10 mol % $R_2O$. It will be understood that any and all values and ranges between the above noted ranges of $R_2O$ are contemplated. Alkali oxides (e.g., $Li_2O$, $Na_2O$, $K_2O$, $Rb_2O$, and $Cs_2O$) may be incorporated into the article for multiple reasons including: (i) reducing the melting temperature, (ii) increasing formability, (iii) enabling chemical strengthening by ion exchange and/or (iv) as a specie to partition into certain crystallites.

According to various examples, $R_2O$ minus $Al_2O_3$ ranges from about from about −35 mol % to about 7 mol %, or from about −12 mol % to about 2.5 mol %, or from about −6% to about 0.25%, or from about −3.0 mol % to about 0 mol %, or from −35 mol % to about 3.8 mol %. It will be understood that any and all values and ranges between the above noted ranges of $R_2O$ minus $Al_2O_3$ are contemplated. Some embodiments include an article (e.g., sheet, tape, fiber, boule), such as a glass-ceramic article, comprising at least one amorphous phase and one crystalline phase; and the glass-ceramic article further comprises $SiO_2$ (as a constituent) from about 1 mol % to about 95 mol %; wherein the crystalline phase comprises an oxide, from about 0.1 mol % to about 100 mol % of the crystalline phase, of at least one of: (i) W, (ii) Mo, (iii) V and an alkali metal cation, and (iv) Ti and an alkali metal cation. In some such embodiments, at least some of the crystalline phase comprises an alkali metal cation, any one or a combination of such alkali metal cations disclosed herein, in some, most, or all crystals of the crystalline phase, chemically integrated within the crystalline phase, as part of the crystalline phase.

The article may include at least one alkaline earth metal oxide. The alkaline earth metal oxide may be represented by the chemical formula RO where RO is one or more of MgO, CaO, SrO, BaO and ZnO. The article may include RO from about 0.02 mol % to about 50 mol % RO, or from about 0.01 mol % to about 5 mol % RO, or from about 0.02 mol % to about 5 mol % RO, or from about 0.05 mol % to about 10 mol % RO, or from about 0.10 mol % to about 5 mol % RO, or from about 0.15 mol % to about 5 mol % RO, or from about 0.05 mol % to about 1 mol % RO, or from about 0.5 mol % to about 4.5 mol % RO, or from about 0 mol % to about 1 mol % RO, or from about 0.96 mol % to about 3.9 mol % RO, or from about 0.2 mol % to about 2 mol % RO, or from about 0.01 mol % to about 0.5 mol % RO, or from about 0.02 mol % to about 0.22 mol % RO. It will be understood that any and all values and ranges between the above noted ranges of RO are contemplated. According to various examples, $R_2O$ may be greater than RO. Further, the article may be free of RO. Alkaline earth oxides (e.g., MgO, CaO, SrO, and BaO) and other divalent oxides such as ZnO may improve the melting behavior of the article and can also act to increase CTE. Young's modulus, and shear modulus of the article.

The article may include from about 0.01 mol % to about 5 mol % of $SnO_2$, or from about 0.01 mol % to about 0.5 mol % of $SnO_2$, or from about 0.05 mol % to about 0.5 mol % $SnO_2$, or from about 0.05 mol % to about 2 mol % $SnO_2$, or from about 0.04 mol % to about 0.4 mol % $SnO_2$, or from about 0.01 mol % to about 0.4 mol % $SnO_2$, or from about 0.04 mol % to about 0.16 mol % $SnO_2$, or from about 0.01 mol % to about 0.21 mol % $SnO_2$, or from about 0 mol % to about 0.2 mol % $SnO_2$, or from about 0 mol % to about 0.1 mol % $SnO_2$. It will be understood that any and all values and ranges between the above noted ranges of $SnO_2$ are contemplated. The article may also include $SnO_2$ as a fining agent (e.g., other fining agents may include $CeO_2$, $As_2O_3$, $Sb_2O_3$, Cl—, F— or the like) in small concentrations to aid in the elimination of gaseous inclusions during melting. Certain fining agents may also act as redox couples, color centers, and or species that nucleate and or intercalate into crystallites formed in the article.

The composition of certain constituents of the article may depend on the presence and/or composition of other constituents. For example, if $WO_3$ is from about 1 mol % to about 30 mol %, the article further includes $Fe_2O_3$ of about 0.9 mol % or less or $SiO_2$ is from about 60 mol % to about 99 mol %. In another example, if $WO_3$ is from about 0.35 mol % to about 1 mol %, the article includes $SnO_2$ from about 0.01 mol % to about 5.0 mol %. In another example, if $MoO_3$ is from about 1 mol % to about 30 mol %, $SiO_2$ is from about 61 mol % to about 99 mol % or $Fe_2O_3$ is about 0.4 mol % or less and $R_2O$ is greater than RO. In another example, if $MoO_3$ is from about 0.9 mol % to about 30% and $SiO_2$ is from about 30 mol % to about 99 mol %, the article includes $SnO_2$ from about 0.01 mol % to about 5 mol %.

The article may be substantially cadmium and substantially selenium free. According to various examples, the article can further include at least one dopant selected from the group consisting of Ti, V, Cr, Mn, Fe, Ni, Cu, Pb, Pd, Au, Cd, Se, Ta, Bi, Ag, Ce, Pr, Nd, and Er to alter the ultraviolet, visual, color and/or near-infrared absorbance. The dopants may have concentration of from about 0.0001 mol % to about 1.0 mol % within the article. For example, the article may include at least one of Ag from about 0.01 mol % to about 0.48 mol %, Au from about 0.01 mol % to about 0.13 mol %, $V_2O_5$ from about 0.01 mol % to about 0.03 mol %, $Fe_2O_3$ from about 0 mol % to about 0.2 mol %, $Fe_2O_3$ from about 0 mol % to about 0.2 mol %, and CuO from about 0.01 mol % to about 0.48 mol %. According to another example, the article may include at least one of Ag from about 0.01 mol % to about 0.75 mol %, Au from about 0.01 mol % to about 0.5 mol %, $V_2O_5$ from about 0.01 mol % to about 0.03 mol %, and CuO from about 0.01 mol % to about 0.75 mol %. The article may include fluorine in the range of about 0 mol % to about 5 mol % to soften the glass. The article may include phosphorus from about 0 mol % to about 5 mol % to further modify physical properties of the article and modulate crystal growth. The article may include $Ga_2O_3$, $In_2O_3$ and/or $GeO_2$ to further modify physical and optical (e.g., refractive index) properties of the article. The following trace impurities may be present in the range of about 0.001 mol % to about 0.5 mol % to further modify the ultraviolet, visible (e.g., 390 nm to about 700 nm), and near-infrared (e.g., about 700 nm to about 2500 nm) absorbance and/or make the article fluoresce: Ti, V, Cr, Mn, Fe, Co, Ni, Cu, Se, Nb, Mo, Tc, Ru, Rh, Pd, Ag, Cd, Te, Ta, Re, Os, Ir, Pt, Au, Ti, Pb, Bi, Ce, Pr, Nd, Sm, Eu, Gd, Tb, Dy, Ho, Er, Tm, Yb, and Lu. Further, small additions of $P_2O_5$ may be made to certain compositions to further modify the physical properties and viscosity of the article.

It will be understood that each of the above noted compositions and composition ranges for $SiO_2$, $Al_2O_3$, $WO_3$, $MoO_3$, $WO_3$ plus $MoO_3$, $B_2O_3$, $R_2O$, RO, $V_2O_5$, Ag, Au, CuO, $SnO_2$, and dopants may be used with any other composition and/or composition range of the other constituents of the article as outlined herein.

As explained above, conventional formation of tungsten, molybdenum, or mixed tungsten-molybdenum containing alkali glasses has been hampered by the separation of the melt constituents during the melting process. The separation of the glass constituents during the melting process resulted in a perceived solubility limit of alkali tungstate within the molten glass, and therefore of articles cast from such melts. Conventionally, when a tungsten, molybdenum, or mixed tungsten-molybdenum melt was even slightly peralkaline (e.g., $R_2O$—$Al_2O_3$=about 0.25 mol % or greater), the melted borosilicate glass formed both a glass and a dense liquid second phase. While the concentration of the alkali tungstate second phase could be reduced by thorough mixing, melting at a high temperature, and employing a small batch size (~1000 g), it could not be fully eliminated leading to a deleterious second crystalline phase forming. It is believed that the formation of this alkali tungstate phase occurs in the initial stages of the melt, where tungsten and/or molybdenum oxide reacts with "free" or "unbound" alkali carbonates. Due to the high density of alkali tungstate and/or alkali molybdate relative to the borosilicate glass that is formed, it rapidly segregates and/or stratifies, pooling at the bottom of the crucible and does not rapidly solubilize in the glass due to the significant difference in density. As the $R_2O$ constituents may provide beneficial properties to the glass composition, simply decreasing the presence of the $R_2O$ constituents within the melt may not be desirable.

It has been discovered by the inventors of the present disclosure that a homogenous single-phase W or Mo-containing peralkaline melt may be obtained through the use of "bound" alkalis. For purposes of this disclosure, "bound" alkalis are alkali elements which are bonded to alumina, boria and/or silica while "free" or "unbound" alkalis are alkali carbonates, alkali nitrates and/or alkali sulfates in which the alkali are not bound to silica, boria or alumina. Exemplary bound alkalis may include feldspar, nepheline, borax, spodumene, other sodium or potassium feldspars, alkali-alumino-silicates, alkali silicates and/or other naturally occurring and artificially created minerals containing an alkali and one or more aluminum, boron and/or silicon atoms. By introducing the alkali in the bound form, the alkalis may not react with the W or Mo present in the melt to form the dense alkali tungstate and/or alkali molybdate liquid. Moreover, this change in batch material may allow the melting of strongly peralkaline compositions (e.g., $R_2O$—$Al_2O_3$=about 2.0 mol % or more) without the formation of any alkali tungstate and/or alkali molybdate second phase. This has also allowed melt temperature and mixing method to be varied and still produce a single-phase homogenous glass. It will be understood that as the alkali tungstate phase and the borosilicate glass are not completely immiscible, prolonged stirring may also allow mixing of the two phases to cast a single phase article.

Once the glass melt is cast and solidified into the glass state article, the article may be annealed, heat treated or otherwise thermally processed to form the crystalline phase within the article. Accordingly, the article may be transformed from the glass state to the glass-ceramic state. The crystalline phase of the glass-ceramic state may take a variety of morphologies. According to various examples, the crystalline phase is formed as a plurality of precipitates within the heat treated region of the article. As such, the precipitates may have a generally crystalline structure.

As used herein, "a crystalline phase" refers to an inorganic material within the articles of the disclosure that is a solid composed of atoms, ions or molecules arranged in a pattern that is periodic in three dimensions. Further, "a crystalline phase" as referenced in this disclosure, unless expressly noted otherwise, is determined to be present using the following method. First, powder x-ray diffraction ("XRD") is employed to detect the presence of crystalline precipitates. Second, Raman spectroscopy ("Raman") is employed to detect the presence of crystalline precipitates in the event that XRD is unsuccessful (e.g., due to size, quantity and/or chemistry of the precipitates). Optionally, transmission electron microscopy ("TEM") is employed to visually confirm or otherwise substantiate the determination of crystalline precipitates obtained through the XRD and/or Raman techniques. In certain circumstances, the quantity and/or size of the precipitates may be low enough that visual confirmation of the precipitates proves particularly difficult. As such, the larger sample size of XRD and Raman may be advantageous in sampling a greater quantity of material to determine the presence of the precipitates.

The crystalline precipitates may have a generally rod-like or needle-like morphology. The precipitates may have a longest length dimension of from about 1 nm to about 500 nm, or from about 1 nm to about 400 nm, or from about 1 nm to about 300 nm, or from about 1 nm to about 250 nm, or from about 1 nm to about 200 nm, or from about 1 nm to about 100 nm, or from about 1 nm to about 75 nm, or from about 1 nm to about 50 nm, or from about 1 nm to about 25 nm or from about 1 nm to about 20 nm or from about 1 nm to about 10 nm. The size of the precipitates may be measured using Electron Microscopy. For purposes of this disclosure, the term "Electron Microscopy" means visually measuring the longest length of the precipitates first by using a scanning electron microscope, and if unable to resolve the precipitates, next using a transmission electron microscope. As the crystalline precipitates may generally have a rod-like or needle-like morphology, the precipitates may have a width of from about 2 nm to about 30 nm, or from about 2 nm to about 10 nm or from about 2 nm to about 7 nm. It will be understood that the size and/or morphology of the precipitates may be uniform, substantially uniform or may vary. Generally, peraluminous compositions of the article may produce precipitates having a needle-like shape with a length of from about 100 nm to about 250 nm and a width of from about 5 nm to about 30 nm. Peralkaline compositions of the article may produce needle-like precipitates having a length of from about 10 nm to about 30 nm and a width of from about 2 nm to about 7 nm. Ag, Au and/or Cu containing examples of the article may produce rod-like precipitates having a length of from about 2 nm to about 20 nm and a width, or diameter, of from about 2 nm to about 10 nm. A volume fraction of the crystalline phase in the article may range from about 0.001% to about 20%, or from about 0.001% to about 15%, or from about 0.001% to about 10% or from about 0.001% to about 5%, or from about 0.001% to about 1%.

The relatively small size of the precipitates may be advantageous in reducing the amount of light scattered by the precipitates leading to high optical clarity of the article when in the glass-ceramic state. As will be explained in greater detail below, the size and/or quantity of the precipitates may be varied across the article such that different portions of the article may have different optical properties. For example, portions of the article where the precipitates are present may lead to changes in the absorbance, color, reflectance and/or transmission of light, as well as the refractive index as compared to portions of the article where different precipitates (e.g., size and/or quantity) and/or no precipitates are present.

The precipitates may be composed of tungsten oxide and/or molybdenum oxide. The crystalline phase includes an oxide, from about 0.1 mol % to about 100 mol % of the crystalline phase, of at least one of: (i) W, (ii) Mo, (iii) V and an alkali metal cation, and (iv) Ti and an alkali metal cation. Without being bound by theory, it is believed that during thermal processing (e.g., heat treating) of the article, tungsten and/or molybdenum cations agglomerate to form crystalline precipitates thereby transforming the glass state into the glass-ceramic state. The molybdenum and/or tungsten present in the precipitates may be reduced, or partially reduced. For example, the molybdenum and/or tungsten within the precipitates may have an oxidation state of between 0 and about +6. According to various examples, the molybdenum and/or tungsten may have a +6 oxidation state. For example, the precipitates may have the general chemical structure of $WO_3$ and/or $MoO_3$. However, there can also be a significant fraction of tungsten and or molybdenum in the +5 oxidation state and the precipitates may be known as non-stoichiometric tungsten suboxides, non-stoichiometric molybdenum suboxides, "molybdenum bronzes" and/or "tungsten bronzes." One or more of the above-noted alkali metals and/or dopants may be present within the precipitates to compensate the +5 charge on the W or Mo. Tungsten and/or molybdenum bronzes are a group of non-stoichiometric tungsten and/or molybdenum sub-oxides that takes the general chemical form of $M_xWO_3$ or $M_xMoO_3$, where M=H, Li, Na, K, Rb, Cs, Ca, Sr, Ba, Zn, Ag, Au, Cu, Sn, Cd, In, Tl, Pb, Bi, Th, La, Pr, Nd, Sm, Eu, Gd, Dy, Ho, Er, Tm, Yb, Lu, and U, and where $0<x<1$. The structures $M_xWO_3$ and $M_xMoO_3$ are considered to be a solid state defect structure in which holes in a reduced $WO_3$ or $MoO_3$ network are randomly occupied by M atoms, which are dissociated into M+ cations and free electrons. Depending on the concentration of "M," the material properties can range from metallic to semi-conducting, thereby allowing a variety of optical absorption and electronic properties to be tuned. The more 5+ W or Mo, the more M+ cations may be need to compensate and the greater the value of x.

A portion, a majority, substantially all or all of the article may be thermally processed to form the precipitates. Thermal processing techniques may include, but are not limited to, a furnace (e.g., a heat treating furnace), a microwave, a laser and/or other techniques of locally and/or bulk heating of the article. While undergoing thermal processing, the crystalline precipitates internally nucleate within the article in a homogenous manner where the article is thermally processed to transform the glass state into the glass-ceramic state. As such, in some examples, the article may include both the glass state and the glass-ceramic state. In examples where the article is thermally processed in bulk (e.g., the whole article is placed in a furnace), the precipitates may homogenously form throughout the article. In other words, the precipitates may exist from a surface of the article throughout the bulk of the article (i.e., greater than about 10 μm from the surface). In examples where the article is thermally processed locally (e.g., via a laser), the precipitates may only be present where the thermal processing reaches a sufficient temperature (e.g., at the surface and into the bulk of the article proximate the heat source). It will be understood that the article may undergo more than one thermal processing to produce the precipitates. Additionally or alternatively, thermal processing may be utilized to remove and/or alter precipitates which have already been formed (e.g., as a result of previous thermal processing). For example, thermal processing may result in the decomposition of precipitates.

According to various examples, the article may be optically transparent in the visible region of the electromagnetic spectrum (i.e., from about 400 nm to about 700 nm) both where the precipitates are present and where the precipitates are not present (i.e., in portions which are in the glass state or the glass-ceramic state). As used herein, the term "optically transparent" refers to a transmittance of greater than about 1% over a 1 mm path length (e.g., in units of %/mm) over at least one 50 nm-wide wavelength band of light in a range from about 400 nm to about 700 nm. In some examples, the article has a transmittance of about 5%/mm or greater, about 10%/mm or greater, about 15%/mm or greater, about 20%/mm or greater, about 25%/mm or greater, about 30%/mm or greater, about 40%/mm or greater, about 50%/mm or greater, about 60%/mm or greater, about 70%/mm or greater, about 80%/mm or greater and greater than all lower limits between these values, all over at least one 50 nm-wide wavelength band of light in the visible region of the spectrum.

According to various examples, the glass-ceramic state of the article absorbs light in the ultraviolet ("UV") region (i.e., wavelengths of less than about 400 nm) based on the presence of the precipitates without the use of additional coatings or films. In some implementations, the glass-ceramic state of the article is characterized by a transmittance of less than 10%/mm, less than 9%/mm, less than 8%/mm, less than 7%/mm, less than 6%/mm, less than 5%/mm, less than 4%/mm, less than 3%/mm, less than 2%/mm, and even less than 1%/mm, for light in at least one 50 nm-wide wavelength band of light in the UV region of the spectrum (e.g., about 200 nm to about 400 nm). In some examples, the glass-ceramic state absorbs or has an absorption of at least 90%/mm, at least 91%/mm, at least 92%/mm, at least 93%/mm, at least 94%/mm, at least 95%/mm, at least 96%/mm, at least 97%/mm, at least 98%/mm, or even at least 99%/mm for light in at least one 50 nm-wide wavelength band of light in the UV region of the spectrum. The glass-ceramic state may have a sharp UV cutoff wavelength from about 320 nm to about 420 nm. For example, the glass-ceramic state may have a sharp UV cutoff at about 320 nm, about 330 nm, about 340 nm, about 350 nm, about 360 nm, about 370 nm, about 380 nm, about 390 nm, about 400 nm, about 410 nm, about 420 nm, about 430 nm or any value therebetween.

In some examples, the glass-ceramic state of the article has a transmittance of greater than about 5%/mm, greater than about 10%/mm, greater than about 15%/mm, greater than about 20%/mm, greater than about 25%/mm, greater than about 30%/mm, greater than about 40%/mm, greater than about 50%/mm, greater than about 60%/mm, greater than about 70%/mm, greater than about 80%/mm, greater than about 90%/mm and greater than all lower limits between these values, all over at least one 50 nm-wide wavelength band of light in the near-infrared region (NIR) of the spectrum (e.g., from about 700 nm to about 2700 nm). In yet other examples, the glass-ceramic state of the article has a transmittance of less than about 90%/mm, less than about 80%/mm, less than about 70%/mm, less than about 60%/mm, less than about 50%/mm, less than about 40%/mm, less than about 30%/mm, less than about 25%/mm, less than about 20%/mm, less than about 15%/mm, less than about 10%/mm, less than about 5%/mm, less than 4%/mm, less than 3%/mm, less than 2%/mm, less than 1%/mm and even less than 0.1%/mm and less than all upper limits between these values, all over at least one 50 nm-wide wavelength band of light in the NIR region of the spectrum. In other examples, the glass-ceramic state of the article absorbs or has an absorption of at least 90%/mm, at least 91%/mm, at least 92%/mm, at least 93%/mm, at least 94%/mm, at least 95%/mm, at least 96%/mm, at least 97%/mm, at least 98%/mm, or at least 99%/mm, or even at least 99.9%/mm for light in at least one 50 nm-wide wavelength band of light in the NIR region of the spectrum.

Various examples of the present disclosure may offer a variety of properties and advantages. It will be understood that although certain properties and advantages may be disclosed in connection with certain compositions, various properties and advantages disclosed may equally be applicable to other compositions.

With respect to the compositions of Tables 1 and 5 below, articles made of the disclosed compositions may exhibit a low coefficient of thermal expansion ("CTE"). For example, the article may have a coefficient of thermal expansion of from about $10 \times 10^{-7\circ}$ C.$^{-1}$ and about $60 \times 10^{-7\circ}$ C.$^{-1}$ over a temperature range of from about 0° C. to about 300° C. Such a low CTE may allow the article to withstand large and rapid fluctuations in temperature, making such articles suitable for operating in harsh environments. With respect to optical properties, the article may exhibit a less than 1% transmittance at wavelengths of about 368 nm or less, optical transparency in the visible regime (e.g., from about 500 nm to about 700 nm), and strong attenuation (e.g., blocking) of NIR wavelengths (e.g., from about 700 nm to about 1700 nm). Such articles may be advantageous over conventional NIR management solutions in that the article does not employ a coating or film (e.g., which may be mechanically fragile, sensitive to UV light and moisture). As the article is impervious to oxygen, moisture, and ultraviolet wavelengths (i.e., owing to its glass or glass-ceramic nature), the NIR absorbing precipitates may be protected from harsh environmental conditions (e.g., moisture, caustic acids, bases and gases) and rapid changes in temperature. Further, a UV cutoff wavelength and a refractive index change of the glass-ceramic state of the article may be modulatable by thermal treatment post forming. The glass-ceramic state of the article may exhibit a UV cutoff or a change in its refractive index as a result of its crystalline precipitates. The glass state of the article may have a refractive index of about between about 1.505 and about 1.508 while the glass-ceramic state of the article may have a refractive index of from about 1.520 to about 1.522. The thermally modulatable UV cutoff and refractive index may enable one tank of glass to meet multiple UV cutoff glass specifications on the fly by varying the thermal processing conditions post forming of the article. The thermally modulated refractive index can produce a large refractive index delta ($10^{-2}$). Because the thermal treatment required to modulate the UV absorbance is done at high viscosity (e.g., between $10^8$ and $10^{12}$ poise) finished articles can be thermally processed without marring the surface or causing deformation.

With respect to the compositions of Tables 1 and 2, articles made of these compositions may offer a novel family of non-toxic, cadmium and selenium-free articles that exhibit an optical extinction with a sharp and tunable cutoff wavelength. Unlike the Cd-free alternatives to CdSe filter glasses, which contain Se, these articles contain no Resource and Recovery Act ("RCRA") metals or other harmful agents. Additionally, the article may be composed of lower cost elements, unlike the Cd-free alternatives that contain indium and or gallium. With respect to optical properties, articles made of these compositions may offer high transparency (e.g., greater than about 90%) over the NIR out to 2.7 microns. Further, the article may exhibit a sharp visible cutoff wavelength ranging from about 320 nm to 525 nm, which is tunable by thermal processing conditions (e.g., time and temperature), and by composition.

With respect to the compositions of Table 3, articles of these exemplary compositions may use molybdenum in lieu of tungsten which may be advantageous in that molybdenum is generally less expensive than tungsten. Additionally, articles made of these compositions may be thermally processed into the glass-ceramic state which may offer a variety of optical properties. For example, at a thickness of about 0.5 mm, the transmittance of the article of such compositions can range from about 4% to about 30% in the visible spectrum (e.g., about 400 nm to about 700 nm), about 5% to about 15% in the NIR (e.g., about 700 nm to about 1500 nm), a UV transmittance of about 1% or less at wavelengths below about 370 nm and about 5% or less at wavelengths of from about 370 nm to about 390 nm. According to some examples, mixed molybdenum-tungsten examples of the article are capable of absorbing 92.3% of the solar spectrum. Such optical properties may be visually perceived as a tint to the article. Similar to other compositions, the optical properties are generated via the growth of the precipitates and as such the tint may be varied across the article based on thermal processing. This thermally variable tint can be used to create gradients of tint within the article such as the creation of shaded edges or boarders within windshield or moonroof applications of the article. Such a feature may be advantageous in the elimination of frits which are baked onto the surface of conventional windshields and moonroofs. This thermally tunable tint can also be used to create a gradient absorption across the article. Additionally, articles created from these compositions are bleachable and patternable by lasers (e.g., operating at wavelengths of 355 nm, 810 nm, and 10.6 µm). Upon laser exposure to these wavelengths, the exposed region of the article will turn from a blue or grey color (e.g., the color being due to the precipitates) to a transparent water white or faint yellow-tint due to the thermal decomposition of the UV and NIR absorbing precipitates. By rastering the laser along the surface of the article to selectively bleach desired regions, patterns can be created within the article. When the article is bleached, the resulting glass state is no longer absorptive in the NIR such that the bleaching process is self-limiting (i.e., because the NIR absorbing precipitates have been decomposed). Furthermore, selective laser exposure may not only create patterns, but also variable UV & NIR absorbance across the article. According to yet other examples, the article may be pulverized to a sufficiently small size and functionalized to be used as a photothermal susceptor agent for cancer treatment (i.e., due to its NIR absorbing optical properties).

With respect to the compositions of Table 4, articles made of these compositions may be capable of being thermally treated after formation (e.g., to form the glass-ceramic state) to both modulate the optical absorbance and to produce a large range of colors from a single composition. Further, such examples may be capable of fusion formation and/or ion-exchanging. Conventional colored glass compositions which utilize Ag, Au and/or Cu generally rely on the formation of nanoscale metallic precipitates to generate colors. As discovered by the inventors of the present disclosure, $Ag^{1+}$ cations can intercalate into tungsten and molybdenum oxide forming silver tungsten bronzes and/or silver molybdenum bronzes which may provide the article with a polychromatic nature. Surprisingly, with the addition of a small concentration of $Ag_2O$ or $AgNO_3$ to $M_xWO_3$ or $M_xMoO_3$ to the composition of the article many produce a variety of colors (e.g., red, orange, yellow, green, blue, various browns and/or combinations thereof) by thermally processing the article at different times and temperatures. It will be understood that Au and/or Cu may be utilized in a similar manner. Analysis demonstrates that the color tunability is not due to the formation of ensembles of metallic nanoparticles that template atop a crystalline phase (e.g., $M_xWO_3$ or $M_xMoO_3$). Rather, it is believed that the origin of color tunability in these polychromatic articles is due to the change in the band gap energy of the doped tungsten and/or molybdenum oxide precipitates, arising from the concentration of intercalated of alkali cations and $Ag^{1+}$, Au and/or Cu cations into the precipitates to form a pure alkali, pure metal and/or mixed alkali-metal, tungsten and/or molybdenum bronzes of varying stoichiometry. Changes in the band gap energy of the precipitates are due to its stoichiometry and in-turn is largely independent of precipitate size and/or shape. Therefore doped $M_xWO_3$ or $M_xMoO_3$ precipitates can remain the same size and/or shape, yet could be many different colors depending on the dopant "M" identity and concentration "x." Thermally treating such articles may produce a nearly complete rainbow of colors within a single article. Further, gradients of color can be stretched or compressed over some physical distance by a thermal gradient being applied to the article. In yet other examples, the article can be laser patterned to locally alter the color of the article. Such articles may be advantageous for the production of colored sunglass lens blanks, phone and/or tablet covers and/or other products which may be composed of a glass-ceramic and may be aesthetically colored. As the precipitates are positioned within the glass-ceramic, scratch resistance and environmental durability are greater than the conventional metal and polymeric coloring layers applied to provide coloring. As the colors of the article may be altered based on thermal treatment, one tank of glass melt may be used to continuously produce blanks that can be heat treated to the specific color as customer demand dictates. Additionally, articles manufactured from these glass compositions may absorb UV and/or IR radiation similar to the other compositions disclosed herein.

According to various examples of the present disclosure, the article may be amenable to various fusion formation processes. For example, the various compositions of the present disclosure may be utilized in a single or double fusion laminate where a transparent tungsten, molybdenum, or mixed tungsten molybdenum, glass is employed as a clad material around a substrate to form the laminate article. After application as a cladding, the glass state cladding may be transformed to the glass-ceramic state. The glass-ceramic state cladding of the fusion laminate article may have a thickness of from about 50 μm to about 200 μm and may have a strong UV and IR attenuation with high average visible transmittance (e.g., from about 75% to about 85% for automotive windshields and/or architectural glazing), a strong UV and IR attenuation with low visible transmittance (e.g., about 5% to about 30% for automotive side lights, automotive sunroofs, and privacy glazing) and/or a laminate where the visible and infrared absorbance can be modulated by treatment in a gradient furnace, local heating and/or localized bleaching. Additionally, use of the compositions as a cladding to form the article provides a novel process to fully leverage the tunable optical properties while simultaneously producing a strengthened monolithic glass ply.

According to various examples, articles produced from the compositions of the present disclosure may be powdered or granulated and added to a variety of materials. For example, the powdered article may be added to a paint, binder, polymeric material (e.g., polyvinyl butyral), sol-gels and/or combinations thereof. Such a feature may be advantageous in imparting one or more of the characteristics of the article to the above mentioned material.

EXAMPLES

The following examples represent certain non-limiting examples of the composition of the articles of the disclosure.

Referring now to Table 1, the article may have $SiO_2$ from about 58.8 mol % to about 77.58 mol %, $Al_2O_3$ from about 0.66 mol % to about 13.69 mol %, $B_2O_3$ from about 4.42 mol % to about 27 mol %, $R_2O$ from about 0 mol % to about 13.84 mol %, RO from about 0 mol % to about 0.98 mol %, $WO_3$ from about 1.0 mol % to about 13.24 mol % and $SnO_2$ from about 0 mol % to about 0.4 mol %. It will be understood that any of the exemplary compositions of Table 1 may include $MnO_2$ from about 0 mol % to about 0.2 mol %, $Fe_2O_3$ from about 0 mol % to about 0.1 mol %, $TiO_2$ from about 0 mol % to about 0.01 mol %, $As_2O_5$ from about 0 mol % to about 0.17 mol % and/or $Eu_2O_3$ from about 0 mol % to about 0.1 mol %. The compositions of Table 1 are provided in an as-batched state within a crucible.

TABLE 1

| Ex. | $SiO_2$ | $Al_2O_3$ | $B_2O_3$ | $Li_2O$ | $Na_2O$ | $K_2O$ | $Cs_2O$ | MgO | CaO | ZnO | $SnO_2$ | $WO_3$ | $P_2O_5$ |
|---|---|---|---|---|---|---|---|---|---|---|---|---|---|
| 1 | 76.90 | 2.00 | 17.00 | 0.00 | 0.00 | 0.000 | 1.00 | 0.00 | 0.000 | 0.00 | 0.10 | 3.00 | 0.000 |
| 2 | 75.90 | 2.00 | 17.00 | 0.00 | 0.00 | 0.000 | 2.00 | 0.00 | 0.000 | 0.00 | 0.10 | 3.00 | 0.000 |
| 3 | 72.90 | 2.00 | 20.00 | 0.00 | 0.00 | 0.000 | 2.00 | 0.00 | 0.000 | 0.00 | 0.10 | 3.00 | 0.000 |
| 4 | 69.90 | 2.00 | 23.00 | 0.00 | 0.00 | 0.000 | 2.00 | 0.00 | 0.000 | 0.00 | 0.10 | 3.00 | 0.000 |
| 5 | 65.90 | 2.00 | 27.00 | 0.00 | 0.00 | 0.000 | 2.00 | 0.00 | 0.000 | 0.00 | 0.10 | 3.00 | 0.000 |
| 6 | 77.58 | 0.66 | 20.00 | 0.00 | 0.00 | 0.000 | 0.66 | 0.00 | 0.000 | 0.00 | 0.10 | 1.00 | 0.000 |
| 7 | 76.92 | 1.32 | 20.00 | 0.00 | 0.00 | 0.000 | 0.66 | 0.00 | 0.000 | 0.00 | 0.10 | 1.00 | 0.000 |
| 8 | 76.26 | 1.32 | 20.00 | 0.00 | 0.00 | 0.000 | 1.32 | 0.00 | 0.000 | 0.00 | 0.10 | 1.00 | 0.000 |
| 9 | 61.70 | 6.60 | 20.00 | 0.00 | 0.00 | 0.000 | 6.60 | 0.00 | 0.000 | 0.00 | 0.10 | 5.00 | 0.000 |
| 10 | 65.90 | 5.00 | 20.00 | 0.00 | 0.00 | 0.000 | 5.00 | 0.00 | 0.000 | 0.00 | 0.10 | 4.00 | 0.000 |
| 11 | 64.90 | 5.00 | 20.00 | 0.00 | 0.00 | 0.000 | 5.00 | 0.00 | 0.000 | 0.00 | 0.10 | 5.00 | 0.000 |
| 12 | 63.90 | 7.00 | 20.00 | 0.00 | 0.00 | 0.000 | 5.00 | 0.00 | 0.000 | 0.00 | 0.10 | 4.00 | 0.000 |
| 13 | 63.90 | 9.00 | 20.00 | 0.00 | 0.00 | 0.000 | 3.00 | 0.00 | 0.000 | 0.00 | 0.10 | 4.00 | 0.000 |
| 14 | 63.90 | 9.00 | 20.00 | 3.00 | 0.00 | 0.000 | 0.00 | 0.00 | 0.000 | 0.00 | 0.10 | 4.00 | 0.000 |
| 15 | 63.91 | 9.00 | 20.00 | 0.00 | 2.99 | 0.000 | 0.00 | 0.00 | 0.000 | 0.00 | 0.10 | 4.00 | 0.000 |
| 16 | 63.90 | 9.00 | 20.00 | 0.00 | 0.00 | 3.000 | 0.00 | 0.00 | 0.000 | 0.00 | 0.10 | 4.00 | 0.000 |
| 17 | 62.90 | 10.00 | 20.00 | 0.00 | 0.00 | 0.000 | 3.00 | 0.00 | 0.000 | 0.00 | 0.10 | 4.00 | 0.000 |
| 18 | 61.90 | 11.00 | 20.00 | 0.00 | 0.00 | 0.000 | 3.00 | 0.00 | 0.000 | 0.00 | 0.10 | 4.00 | 0.000 |
| 19 | 64.90 | 9.00 | 20.00 | 0.00 | 0.00 | 0.000 | 2.00 | 0.00 | 0.000 | 0.00 | 0.10 | 4.00 | 0.000 |
| 20 | 62.90 | 9.00 | 20.00 | 0.00 | 0.00 | 0.000 | 4.00 | 0.00 | 0.000 | 0.00 | 0.10 | 4.00 | 0.000 |
| 21 | 63.90 | 10.00 | 20.00 | 0.00 | 0.00 | 0.000 | 2.00 | 0.00 | 0.000 | 0.00 | 0.10 | 4.00 | 0.000 |
| 22 | 61.90 | 12.00 | 20.00 | 0.00 | 0.00 | 0.000 | 2.00 | 0.00 | 0.000 | 0.00 | 0.10 | 4.00 | 0.000 |
| 23 | 63.90 | 9.00 | 20.00 | 0.00 | 0.00 | 0.000 | 2.90 | 0.00 | 0.000 | 0.00 | 0.10 | 4.00 | 0.000 |
| 24 | 63.90 | 9.00 | 20.00 | 1.50 | 0.00 | 1.500 | 0.00 | 0.00 | 0.000 | 0.00 | 0.10 | 4.00 | 0.000 |
| 25 | 63.90 | 9.00 | 20.00 | 1.50 | 0.00 | 0.000 | 1.50 | 0.00 | 0.000 | 0.00 | 0.10 | 4.00 | 0.000 |
| 26 | 64.00 | 9.00 | 20.00 | 3.00 | 0.00 | 0.000 | 0.00 | 0.00 | 0.000 | 0.00 | 0.00 | 4.00 | 0.000 |
| 27 | 64.40 | 9.00 | 20.00 | 3.00 | 0.00 | 0.000 | 0.00 | 0.00 | 0.000 | 0.00 | 0.10 | 3.50 | 0.000 |
| 28 | 64.90 | 9.00 | 20.00 | 3.00 | 0.00 | 0.000 | 0.00 | 0.00 | 0.000 | 0.00 | 0.10 | 3.00 | 0.000 |
| 29 | 65.40 | 9.00 | 20.00 | 3.00 | 0.00 | 0.000 | 0.00 | 0.00 | 0.000 | 0.00 | 0.10 | 2.50 | 0.000 |
| 30 | 64.90 | 9.00 | 20.00 | 2.00 | 0.00 | 0.000 | 0.00 | 0.00 | 0.000 | 0.00 | 0.10 | 4.00 | 0.000 |
| 31 | 65.90 | 9.00 | 20.00 | 1.00 | 0.00 | 0.000 | 0.00 | 0.00 | 0.000 | 0.00 | 0.10 | 4.00 | 0.000 |
| 32 | 66.90 | 9.00 | 20.00 | 0.00 | 0.00 | 0.000 | 0.00 | 0.00 | 0.000 | 0.00 | 0.10 | 4.00 | 0.000 |
| 33 | 65.90 | 9.00 | 20.00 | 3.00 | 0.00 | 0.000 | 0.00 | 0.00 | 0.000 | 0.00 | 0.10 | 2.00 | 0.000 |
| 34 | 66.40 | 9.00 | 20.00 | 3.00 | 0.00 | 0.000 | 0.00 | 0.00 | 0.000 | 0.00 | 0.10 | 1.50 | 0.000 |
| 35 | 60.90 | 9.00 | 20.00 | 6.00 | 0.00 | 0.000 | 0.00 | 0.00 | 0.000 | 0.00 | 0.10 | 4.00 | 0.000 |
| 36 | 65.90 | 9.00 | 15.00 | 6.00 | 0.00 | 0.000 | 0.00 | 0.00 | 0.000 | 0.00 | 0.10 | 4.00 | 0.000 |
| 37 | 69.90 | 10.00 | 10.00 | 6.00 | 0.00 | 0.000 | 0.00 | 0.00 | 0.000 | 0.00 | 0.10 | 4.00 | 0.000 |
| 38 | 66.00 | 9.00 | 20.00 | 3.00 | 0.00 | 0.000 | 0.00 | 0.00 | 0.000 | 0.00 | 0.00 | 2.00 | 0.000 |
| 39 | 65.90 | 9.00 | 20.00 | 3.00 | 0.00 | 0.000 | 0.00 | 0.00 | 0.000 | 0.00 | 0.10 | 2.00 | 0.000 |
| 40 | 65.80 | 9.00 | 20.00 | 3.00 | 0.00 | 0.000 | 0.00 | 0.00 | 0.000 | 0.00 | 0.20 | 2.00 | 0.000 |
| 41 | 65.60 | 9.00 | 20.00 | 3.00 | 0.00 | 0.000 | 0.00 | 0.00 | 0.000 | 0.00 | 0.40 | 2.00 | 0.000 |
| 42 | 65.80 | 9.00 | 20.00 | 3.00 | 0.00 | 0.000 | 0.00 | 0.00 | 0.000 | 0.00 | 0.00 | 2.00 | 0.000 |
| 43 | 65.90 | 9.00 | 20.00 | 3.00 | 0.00 | 0.000 | 0.00 | 0.00 | 0.000 | 0.00 | 0.00 | 2.00 | 0.000 |
| 44 | 67.41 | 9.61 | 9.95 | 0.00 | 7.86 | 1.202 | 0.00 | 0.00 | 0.010 | 0.00 | 0.10 | 3.85 | 0.000 |

TABLE 1-continued

| Ex. | SiO2 | Al2O3 | B2O3 | Li2O | Na2O | K2O | Cs2O | MgO | CaO | ZnO | SnO2 | WO3 | P2O5 |
|---|---|---|---|---|---|---|---|---|---|---|---|---|---|
| 45 | 67.42 | 9.62 | 9.42 | 0.00 | 8.13 | 1.467 | 0.00 | 0.00 | 0.000 | 0.00 | 0.10 | 3.85 | 0.000 |
| 46 | 67.18 | 9.62 | 9.42 | 0.00 | 8.25 | 1.587 | 0.00 | 0.00 | 0.000 | 0.00 | 0.10 | 3.85 | 0.000 |
| 47 | 67.66 | 9.62 | 9.42 | 0.00 | 8.01 | 1.346 | 0.00 | 0.00 | 0.000 | 0.00 | 0.10 | 3.85 | 0.000 |
| 48 | 67.42 | 9.62 | 8.99 | 0.00 | 7.90 | 2.124 | 0.00 | 0.00 | 0.000 | 0.00 | 0.10 | 3.85 | 0.000 |
| 49 | 67.23 | 9.62 | 9.95 | 0.00 | 7.86 | 1.202 | 0.00 | 0.00 | 0.000 | 0.00 | 0.29 | 3.85 | 0.000 |
| 50 | 65.50 | 9.62 | 10.92 | 0.00 | 8.34 | 1.683 | 0.00 | 0.00 | 0.000 | 0.00 | 0.10 | 3.85 | 0.000 |
| 51 | 67.18 | 9.62 | 9.42 | 0.00 | 8.25 | 1.587 | 0.00 | 0.00 | 0.000 | 0.00 | 0.10 | 3.85 | 0.000 |
| 52 | 67.17 | 9.62 | 9.42 | 3.85 | 4.41 | 1.587 | 0.00 | 0.00 | 0.000 | 0.00 | 0.10 | 3.85 | 0.000 |
| 53 | 67.17 | 9.62 | 9.42 | 7.69 | 0.58 | 1.587 | 0.00 | 0.00 | 0.000 | 0.00 | 0.10 | 3.85 | 0.000 |
| 54 | 67.51 | 9.42 | 9.47 | 0.00 | 8.41 | 1.715 | 0.00 | 0.00 | 0.000 | 0.00 | 0.10 | 3.38 | 0.000 |
| 55 | 67.56 | 9.62 | 9.42 | 0.00 | 8.01 | 1.346 | 0.00 | 0.10 | 0.011 | 0.00 | 0.10 | 3.85 | 0.000 |
| 56 | 67.17 | 9.62 | 9.42 | 0.00 | 8.01 | 1.346 | 0.00 | 0.48 | 0.014 | 0.00 | 0.10 | 3.85 | 0.000 |
| 57 | 66.69 | 9.01 | 9.42 | 0.00 | 8.60 | 1.346 | 0.00 | 0.96 | 0.019 | 0.00 | 0.10 | 3.85 | 0.000 |
| 58 | 66.52 | 9.66 | 9.47 | 0.00 | 8.28 | 1.594 | 0.00 | 0.03 | 0.000 | 0.00 | 0.10 | 3.86 | 0.483 |
| 59 | 66.44 | 9.61 | 9.42 | 0.00 | 8.24 | 1.586 | 0.00 | 0.03 | 0.000 | 0.72 | 0.10 | 3.85 | 0.000 |
| 60 | 67.08 | 9.62 | 9.42 | 0.00 | 8.25 | 1.587 | 0.00 | 0.03 | 0.000 | 0.00 | 0.00 | 3.85 | 0.000 |
| 61 | 66.12 | 9.62 | 10.39 | 2.88 | 6.95 | 0.000 | 0.00 | 0.10 | 0.000 | 0.00 | 0.10 | 3.85 | 0.000 |
| 62 | 67.18 | 9.62 | 9.42 | 0.00 | 8.25 | 1.587 | 0.00 | 0.00 | 0.000 | 0.00 | 0.10 | 3.85 | 0.000 |
| 63 | 67.18 | 9.62 | 9.42 | 0.00 | 8.25 | 1.587 | 0.00 | 0.00 | 0.000 | 0.00 | 0.10 | 3.85 | 0.000 |
| 64 | 67.18 | 9.62 | 9.42 | 0.00 | 8.25 | 1.587 | 0.00 | 0.00 | 0.000 | 0.00 | 0.10 | 3.85 | 0.000 |
| 65 | 67.18 | 9.62 | 9.42 | 0.00 | 8.25 | 1.587 | 0.00 | 0.00 | 0.000 | 0.00 | 0.10 | 3.85 | 0.000 |
| 66 | 67.18 | 9.62 | 9.43 | 0.00 | 9.83 | 0.000 | 0.00 | 0.00 | 0.000 | 0.00 | 0.10 | 3.85 | 0.000 |
| 67 | 66.45 | 9.62 | 9.42 | 8.41 | 0.58 | 1.587 | 0.00 | 0.00 | 0.000 | 0.00 | 0.10 | 3.85 | 0.000 |
| 68 | 67.17 | 9.62 | 9.42 | 0.00 | 8.25 | 1.587 | 0.00 | 0.00 | 0.000 | 0.72 | 0.10 | 3.85 | 0.000 |
| 69 | 62.44 | 11.65 | 8.64 | 4.76 | 6.29 | 1.262 | 0.00 | 0.00 | 0.000 | 0.00 | 0.10 | 3.88 | 0.971 |
| 70 | 67.10 | 9.61 | 9.41 | 0.00 | 8.24 | 1.585 | 0.00 | 0.12 | 0.000 | 0.00 | 0.10 | 3.84 | 0.000 |
| 71 | 67.02 | 9.59 | 9.40 | 0.00 | 8.23 | 1.583 | 0.00 | 0.23 | 0.000 | 0.00 | 0.10 | 3.84 | 0.000 |
| 72 | 66.86 | 9.57 | 9.38 | 0.00 | 8.21 | 1.579 | 0.00 | 0.47 | 0.000 | 0.00 | 0.10 | 3.83 | 0.000 |
| 73 | 67.16 | 9.61 | 9.42 | 0.00 | 8.24 | 1.586 | 0.00 | 0.02 | 0.000 | 0.00 | 0.10 | 3.85 | 0.000 |
| 74 | 67.16 | 9.61 | 9.42 | 0.00 | 8.24 | 1.586 | 0.00 | 0.02 | 0.000 | 0.00 | 0.10 | 3.85 | 0.000 |
| 75 | 67.15 | 9.61 | 9.42 | 0.00 | 8.24 | 1.586 | 0.00 | 0.02 | 0.000 | 0.00 | 0.10 | 3.84 | 0.000 |
| 76 | 67.10 | 9.61 | 9.41 | 0.00 | 8.24 | 1.585 | 0.00 | 0.12 | 0.000 | 0.00 | 0.10 | 3.84 | 0.000 |
| 77 | 67.12 | 9.61 | 9.42 | 0.00 | 8.24 | 1.585 | 0.00 | 0.12 | 0.000 | 0.00 | 0.07 | 3.84 | 0.000 |
| 78 | 67.07 | 9.60 | 9.41 | 0.00 | 8.23 | 1.584 | 0.00 | 0.19 | 0.000 | 0.00 | 0.05 | 3.84 | 0.000 |
| 79 | 67.15 | 9.61 | 9.42 | 3.84 | 4.41 | 1.586 | 0.00 | 0.00 | 0.080 | 0.00 | 0.05 | 3.85 | 0.000 |
| 80 | 67.11 | 9.61 | 9.41 | 3.84 | 4.41 | 1.585 | 0.00 | 0.00 | 0.130 | 0.00 | 0.05 | 3.84 | 0.000 |
| 81 | 67.12 | 9.61 | 9.42 | 3.84 | 4.41 | 1.585 | 0.00 | 0.00 | 0.130 | 0.00 | 0.05 | 3.84 | 0.000 |
| 82 | 67.16 | 9.61 | 9.42 | 3.85 | 4.41 | 1.586 | 0.00 | 0.00 | 0.065 | 0.00 | 0.05 | 3.85 | 0.000 |
| 83 | 67.44 | 9.41 | 9.46 | 5.79 | 2.74 | 1.593 | 0.00 | 0.00 | 0.127 | 0.00 | 0.05 | 3.38 | 0.000 |
| 84 | 67.12 | 9.61 | 9.42 | 0.00 | 8.24 | 1.586 | 0.00 | 0.00 | 0.131 | 0.00 | 0.05 | 3.84 | 0.000 |
| 85 | 67.16 | 9.61 | 9.42 | 3.84 | 5.99 | 0.000 | 0.00 | 0.00 | 0.080 | 0.00 | 0.05 | 3.85 | 0.000 |
| 86 | 67.14 | 9.61 | 9.42 | 4.84 | 4.99 | 0.021 | 0.00 | 0.00 | 0.080 | 0.00 | 0.05 | 3.84 | 0.000 |
| 87 | 67.18 | 9.62 | 9.43 | 3.85 | 5.60 | 0.397 | 0.00 | 0.00 | 0.036 | 0.00 | 0.05 | 3.85 | 0.000 |
| 88 | 67.17 | 9.62 | 9.42 | 3.85 | 5.30 | 0.697 | 0.00 | 0.00 | 0.058 | 0.00 | 0.05 | 3.85 | 0.000 |
| 89 | 67.18 | 9.62 | 9.43 | 4.81 | 4.64 | 0.397 | 0.00 | 0.00 | 0.035 | 0.00 | 0.05 | 3.85 | 0.000 |
| 90 | 67.16 | 9.61 | 9.42 | 3.84 | 5.99 | 0.000 | 0.00 | 0.00 | 0.080 | 0.00 | 0.05 | 3.85 | 0.000 |
| 91 | 66.90 | 9.61 | 9.42 | 5.08 | 5.00 | 0.022 | 0.00 | 0.00 | 0.080 | 0.00 | 0.05 | 3.84 | 0.000 |
| 92 | 66.42 | 9.61 | 9.42 | 5.56 | 5.00 | 0.024 | 0.00 | 0.00 | 0.080 | 0.00 | 0.05 | 3.84 | 0.000 |
| 93 | 64.97 | 10.57 | 9.42 | 6.03 | 5.01 | 0.026 | 0.00 | 0.00 | 0.080 | 0.00 | 0.05 | 3.84 | 0.000 |
| 94 | 64.49 | 10.57 | 9.42 | 6.51 | 5.01 | 0.028 | 0.00 | 0.00 | 0.080 | 0.00 | 0.05 | 3.84 | 0.000 |
| 95 | 62.55 | 11.53 | 9.42 | 6.63 | 5.21 | 0.725 | 0.00 | 0.00 | 0.055 | 0.00 | 0.05 | 3.84 | 0.000 |
| 96 | 65.94 | 9.61 | 9.42 | 6.03 | 5.00 | 0.026 | 0.00 | 0.00 | 0.080 | 0.00 | 0.05 | 3.84 | 0.000 |
| 97 | 67.12 | 9.61 | 9.42 | 3.84 | 4.41 | 1.586 | 0.00 | 0.00 | 0.121 | 0.00 | 0.05 | 3.84 | 0.000 |
| 98 | 66.96 | 9.59 | 9.39 | 3.83 | 4.40 | 1.582 | 0.00 | 0.00 | 0.121 | 0.00 | 0.05 | 4.07 | 0.000 |
| 99 | 66.80 | 9.56 | 9.37 | 3.82 | 4.39 | 1.578 | 0.00 | 0.00 | 0.120 | 0.00 | 0.05 | 4.30 | 0.000 |
| 100 | 66.49 | 9.52 | 9.33 | 3.81 | 4.37 | 1.570 | 0.00 | 0.00 | 0.120 | 0.00 | 0.05 | 4.76 | 0.000 |
| 101 | 65.38 | 13.69 | 4.88 | 7.70 | 1.92 | 0.033 | 0.00 | 0.00 | 0.014 | 0.00 | 0.10 | 4.39 | 1.891 |
| 102 | 62.46 | 13.69 | 7.81 | 7.70 | 1.92 | 0.033 | 0.00 | 0.00 | 0.014 | 0.00 | 0.10 | 4.39 | 1.891 |
| 103 | 65.30 | 13.67 | 4.88 | 7.69 | 1.92 | 0.033 | 0.00 | 0.00 | 0.146 | 0.00 | 0.10 | 4.38 | 1.888 |
| 104 | 64.81 | 13.67 | 4.88 | 8.17 | 1.92 | 0.035 | 0.00 | 0.00 | 0.146 | 0.00 | 0.10 | 4.38 | 1.888 |
| 105 | 61.18 | 13.20 | 6.79 | 10.06 | 3.73 | 0.043 | 0.00 | 0.00 | 0.142 | 0.00 | 0.11 | 4.75 | 0.000 |
| 106 | 64.18 | 13.54 | 4.83 | 8.09 | 1.91 | 0.034 | 0.00 | 0.00 | 0.145 | 0.00 | 0.10 | 5.30 | 1.870 |
| 107 | 63.57 | 13.41 | 4.78 | 8.02 | 1.89 | 0.034 | 0.00 | 0.00 | 0.143 | 0.00 | 0.10 | 6.20 | 1.852 |
| 108 | 61.51 | 12.98 | 4.63 | 7.76 | 1.83 | 0.033 | 0.00 | 0.00 | 0.139 | 0.00 | 0.09 | 9.24 | 1.792 |
| 109 | 58.80 | 12.41 | 4.42 | 7.42 | 1.75 | 0.032 | 0.00 | 0.00 | 0.132 | 0.00 | 0.09 | 13.24 | 1.713 |

Referring now to Table 2, the article may have SiO2 from about 65.43 mol % to about 66.7 mol %, Al2O3 from about 9.6 mol % to about 9.98 mol %, B2O3 from about 9.41 mol % to about 10.56 mol %, R2O from about 6.47 mol % to about 9.51 mol %, RO from about 0.96 mol % to about 3.85 mol %, WO3 from about 1.92 mol % to about 3.85 mol %, MoO3 from about 0 mol % to about 1.92 mol % and SnO2 from about 0 mol % to about 0.1 mol %. The compositions of Table 2 are provided in an as-batched state within a crucible.

TABLE 2

| Ex. | SiO$_2$ | Al$_2$O$_3$ | B$_2$O$_3$ | Li$_2$O | Na$_2$O | K$_2$O | Cs$_2$O | MgO | CaO | SrO | BaO | SnO$_2$ | WO$_3$ | MoO$_3$ |
|---|---|---|---|---|---|---|---|---|---|---|---|---|---|---|
| 110 | 66.70 | 9.62 | 9.42 | 0.00 | 8.01 | 1.346 | 0.00 | 0.96 | 0.000 | 0.000 | 0.000 | 0.10 | 3.85 | 0.00 |
| 111 | 66.58 | 9.60 | 9.41 | 0.00 | 7.99 | 1.344 | 0.00 | 0.03 | 0.149 | 0.960 | 0.005 | 0.10 | 3.84 | 0.00 |
| 112 | 66.67 | 9.61 | 9.42 | 0.00 | 8.00 | 1.346 | 0.00 | 0.03 | 0.011 | 0.008 | 0.961 | 0.10 | 3.85 | 0.00 |
| 113 | 66.21 | 9.62 | 9.42 | 0.00 | 8.01 | 1.346 | 0.00 | 1.44 | 0.021 | 0.000 | 0.000 | 0.10 | 3.85 | 0.00 |
| 114 | 66.69 | 9.98 | 9.42 | 0.00 | 7.65 | 1.346 | 0.00 | 0.96 | 0.017 | 0.000 | 0.000 | 0.10 | 3.85 | 0.00 |
| 115 | 66.58 | 9.60 | 9.41 | 0.00 | 0.15 | 9.360 | 0.00 | 0.96 | 0.010 | 0.000 | 0.000 | 0.10 | 3.84 | 0.00 |
| 116 | 66.65 | 9.61 | 9.42 | 9.37 | 0.06 | 0.000 | 0.00 | 0.96 | 0.000 | 0.000 | 0.000 | 0.10 | 3.84 | 0.00 |
| 117 | 66.59 | 9.60 | 9.41 | 0.00 | 0.33 | 0.007 | 9.17 | 0.96 | 0.000 | 0.000 | 0.000 | 0.10 | 3.84 | 0.00 |
| 118 | 65.43 | 9.60 | 10.56 | 0.00 | 0.15 | 9.361 | 0.00 | 0.96 | 0.000 | 0.000 | 0.000 | 0.10 | 3.84 | 0.00 |
| 119 | 66.70 | 9.62 | 9.42 | 0.00 | 7.53 | 0.866 | 0.00 | 1.92 | 0.000 | 0.000 | 0.000 | 0.10 | 3.85 | 0.00 |
| 120 | 66.70 | 9.62 | 9.42 | 0.00 | 6.47 | 0.000 | 0.00 | 3.85 | 0.000 | 0.000 | 0.000 | 0.10 | 3.85 | 0.00 |
| 121 | 66.70 | 9.62 | 9.42 | 0.00 | 8.01 | 1.346 | 0.00 | 0.96 | 0.000 | 0.000 | 0.000 | 0.10 | 2.89 | 0.96 |
| 122 | 66.70 | 9.62 | 9.42 | 0.00 | 8.01 | 1.346 | 0.00 | 0.96 | 0.000 | 0.000 | 0.000 | 0.10 | 1.92 | 1.92 |

Referring now to Table 3, the article may have SiO$_2$ from about 60.15 mol % to about 67.29 mol %, Al$_2$O$_3$ from about 9.0 mol % to about 13.96 mol %, B$_2$O$_3$ from about 4.69 mol % to about 20 mol %, R$_2$O from about 2.99 mol % to about 12.15 mol %, RO from about 0.00 mol % to about 0.14 mol %, WO$_3$ from about 0 mol % to about 7.03 mol %, MoO$_3$ from about 0 mol % to about 8.18 mol %, SnO$_2$ from about 0.05 mol % to about 0.15 mol % and V$_2$O$_5$ from about 0 mol % to about 0.34 mol %. It will be understood that any of the exemplary compositions of Table 3 may include Fe$_2$O$_3$ from about 0 mol % to about 0.0025 mol %. The compositions of Table 3 are provided in an as-batched state within a crucible.

9.55 mol % to about 11.42 mol %, B$_2$O$_3$ from about 9.36 mol % to about 15.34 mol %, R$_2$O from about 9.79 mol % to about 13.72 mol %, RO from about 0.00 mol % to about 0.22 mol %, WO$_3$ from about 1.74 mol % to about 4.48 mol %, MoO$_3$ from about 0 mol % to about 1.91 mol %, SnO$_2$ from about 0.0 mol % to about 0.21 mol %, V$_2$O$_5$ from about 0 mol % to about 0.03 mol %, Ag from about 0 mol % to about 0.48 mol % and Au from about 0 mol % to about 0.01 mol %. It will be understood that any of the exemplary compositions of Table 4 may include CeO$_2$ from about 0 mol % to about 0.19 mol %, CuO from about 0 mol % to about 0.48 mol %, Br— from about 0 mol % to about 0.52 mol %, Cl— from about 0 mol % to about 0.2 mol %, TiO$_2$ from about 0 mol % to about 0.96 mol % and/or Sb$_2$O$_3$ from about

TABLE 3

| Ex. | SiO$_2$ | Al$_2$O$_3$ | B$_2$O$_3$ | Li$_2$O | Na$_2$O | K$_2$O | Cs$_2$O | MgO | CaO | SnO$_2$ | WO$_3$ | MoO$_3$ | P$_2$O$_5$ | V$_2$O$_5$ |
|---|---|---|---|---|---|---|---|---|---|---|---|---|---|---|
| 123 | 63.90 | 9.00 | 20.00 | 3.00 | 0.00 | 0.000 | 0.00 | 0.00 | 0.000 | 0.10 | 0.00 | 4.00 | 0.00 | 0.000 |
| 124 | 63.91 | 9.00 | 20.00 | 0.00 | 2.99 | 0.000 | 0.00 | 0.00 | 0.000 | 0.10 | 0.00 | 4.00 | 0.00 | 0.000 |
| 125 | 63.90 | 9.00 | 20.00 | 0.00 | 0.00 | 3.000 | 0.00 | 0.00 | 0.000 | 0.10 | 0.00 | 4.00 | 0.00 | 0.000 |
| 126 | 63.90 | 9.00 | 20.00 | 0.00 | 0.00 | 0.000 | 3.00 | 0.00 | 0.000 | 0.10 | 0.00 | 4.00 | 0.00 | 0.000 |
| 127 | 64.90 | 9.00 | 20.00 | 3.00 | 0.00 | 0.000 | 0.00 | 0.00 | 0.000 | 0.10 | 0.00 | 3.00 | 0.00 | 0.000 |
| 128 | 62.90 | 11.00 | 20.00 | 3.00 | 0.00 | 0.000 | 0.00 | 0.00 | 0.000 | 0.10 | 0.00 | 3.00 | 0.00 | 0.000 |
| 129 | 65.31 | 13.96 | 13.47 | 3.07 | 0.00 | 0.000 | 0.00 | 0.00 | 0.000 | 0.10 | 0.00 | 4.09 | 0.00 | 0.000 |
| 130 | 60.15 | 13.96 | 13.47 | 4.09 | 0.00 | 0.000 | 0.00 | 0.00 | 0.000 | 0.15 | 0.00 | 8.18 | 0.00 | 0.000 |
| 131 | 67.17 | 9.62 | 9.42 | 4.84 | 5.00 | 0.021 | 0.00 | 0.02 | 0.019 | 0.05 | 3.61 | 0.24 | 0.00 | 0.000 |
| 132 | 67.17 | 9.62 | 9.42 | 4.84 | 5.00 | 0.021 | 0.00 | 0.02 | 0.019 | 0.05 | 3.37 | 0.48 | 0.00 | 0.000 |
| 133 | 67.17 | 9.62 | 9.42 | 4.84 | 5.00 | 0.021 | 0.00 | 0.02 | 0.019 | 0.05 | 2.88 | 0.96 | 0.00 | 0.000 |
| 134 | 67.18 | 9.62 | 9.42 | 4.85 | 5.00 | 0.021 | 0.00 | 0.00 | 0.019 | 0.05 | 1.92 | 1.92 | 0.00 | 0.000 |
| 135 | 67.18 | 9.62 | 9.42 | 4.85 | 5.00 | 0.021 | 0.00 | 0.00 | 0.019 | 0.05 | 0.96 | 2.89 | 0.00 | 0.000 |
| 136 | 65.24 | 11.60 | 7.04 | 4.37 | 7.77 | 0.000 | 0.00 | 0.00 | 0.079 | 0.10 | 2.85 | 0.95 | 0.00 | 0.000 |
| 137 | 65.24 | 11.60 | 7.04 | 4.37 | 7.77 | 0.000 | 0.00 | 0.00 | 0.079 | 0.10 | 1.90 | 1.90 | 0.00 | 0.000 |
| 138 | 67.12 | 9.61 | 9.42 | 3.84 | 4.41 | 1.586 | 0.00 | 0.00 | 0.121 | 0.05 | 2.88 | 0.96 | 0.00 | 0.000 |
| 139 | 67.12 | 9.61 | 9.42 | 3.84 | 4.41 | 1.586 | 0.00 | 0.00 | 0.121 | 0.05 | 1.92 | 1.92 | 0.00 | 0.000 |
| 140 | 66.96 | 9.59 | 9.39 | 3.83 | 4.40 | 1.582 | 0.00 | 0.00 | 0.121 | 0.05 | 2.88 | 1.20 | 0.00 | 0.000 |
| 141 | 66.80 | 9.56 | 9.37 | 3.82 | 4.39 | 1.578 | 0.00 | 0.00 | 0.121 | 0.05 | 2.87 | 1.43 | 0.00 | 0.000 |
| 142 | 66.49 | 9.52 | 9.33 | 3.81 | 4.37 | 1.570 | 0.00 | 0.00 | 0.120 | 0.05 | 2.86 | 1.90 | 0.00 | 0.000 |
| 143 | 66.96 | 9.59 | 9.39 | 3.83 | 4.40 | 1.582 | 0.00 | 0.00 | 0.121 | 0.05 | 1.92 | 2.16 | 0.00 | 0.000 |
| 144 | 66.80 | 9.56 | 9.37 | 3.82 | 4.39 | 1.578 | 0.00 | 0.00 | 0.120 | 0.05 | 1.91 | 2.39 | 0.00 | 0.000 |
| 145 | 66.64 | 9.54 | 9.35 | 3.82 | 4.38 | 1.574 | 0.00 | 0.00 | 0.120 | 0.05 | 1.91 | 2.62 | 0.00 | 0.000 |
| 146 | 67.16 | 9.61 | 9.42 | 4.84 | 5.00 | 0.021 | 0.00 | 0.00 | 0.003 | 0.10 | 2.88 | 0.96 | 0.00 | 0.000 |
| 147 | 67.15 | 9.61 | 9.42 | 6.77 | 3.08 | 0.029 | 0.00 | 0.00 | 0.002 | 0.10 | 2.88 | 0.96 | 0.00 | 0.000 |
| 148 | 62.97 | 13.28 | 4.74 | 7.94 | 1.87 | 0.034 | 0.00 | 0.00 | 0.142 | 0.09 | 6.15 | 0.95 | 1.83 | 0.000 |
| 149 | 62.38 | 13.16 | 4.69 | 7.87 | 1.85 | 0.034 | 0.00 | 0.00 | 0.140 | 0.09 | 7.03 | 0.94 | 1.82 | 0.000 |
| 150 | 67.10 | 9.61 | 9.41 | 3.84 | 4.41 | 1.585 | 0.00 | 0.00 | 0.121 | 0.05 | 2.88 | 0.96 | 0.00 | 0.034 |
| 151 | 67.10 | 9.61 | 9.41 | 3.84 | 4.41 | 1.585 | 0.00 | 0.00 | 0.121 | 0.05 | 1.92 | 1.92 | 0.00 | 0.034 |
| 152 | 67.10 | 9.61 | 9.41 | 3.84 | 4.41 | 1.585 | 0.00 | 0.00 | 0.121 | 0.05 | 3.84 | 0.00 | 0.00 | 0.034 |
| 153 | 67.11 | 9.61 | 9.41 | 3.84 | 4.41 | 1.585 | 0.00 | 0.00 | 0.121 | 0.05 | 3.84 | 0.00 | 0.00 | 0.029 |
| 154 | 67.29 | 9.63 | 9.44 | 4.85 | 4.81 | 0.021 | 0.00 | 0.00 | 0.019 | 0.05 | 3.85 | 0.00 | 0.00 | 0.034 |
| 155 | 67.15 | 9.61 | 9.42 | 4.84 | 4.99 | 0.021 | 0.00 | 0.00 | 0.019 | 0.05 | 3.85 | 0.00 | 0.00 | 0.038 |
| 156 | 67.12 | 9.61 | 9.42 | 4.84 | 4.99 | 0.021 | 0.00 | 0.00 | 0.019 | 0.05 | 3.84 | 0.00 | 0.00 | 0.096 |
| 157 | 66.96 | 9.58 | 9.39 | 4.83 | 4.98 | 0.021 | 0.00 | 0.00 | 0.019 | 0.05 | 3.83 | 0.00 | 0.00 | 0.335 |

Referring now to Table 4, the article may have SiO$_2$ from about 54.01 mol % to about 67.66 mol %, Al$_2$O$_3$ from about 0 mol % to about 0.29 mol %. The compositions of Table 4 are provided in an as-batched state within a crucible.

TABLE 4

| Ex. | SiO$_2$ | Al$_2$O$_3$ | B$_2$O$_3$ | Li$_2$O | Na$_2$O | K$_2$O | MgO | CaO | SnO$_2$ | WO$_3$ | MoO$_3$ | Ag | Au | V$_2$O$_5$ | F— |
|---|---|---|---|---|---|---|---|---|---|---|---|---|---|---|---|
| 158 | 63.05 | 10.54 | 11.38 | 5.31 | 5.99 | 0.023 | 0.00 | 0.021 | 0.10 | 3.48 | 0.00 | 0.105 | 0.000 | 0.005 | 0.00 |
| 159 | 63.05 | 10.54 | 11.38 | 5.31 | 5.99 | 0.023 | 0.00 | 0.021 | 0.10 | 3.48 | 0.00 | 0.105 | 0.000 | 0.010 | 0.00 |
| 160 | 63.04 | 10.54 | 11.37 | 5.31 | 5.99 | 0.023 | 0.00 | 0.021 | 0.10 | 3.48 | 0.00 | 0.105 | 0.000 | 0.020 | 0.00 |
| 161 | 67.51 | 9.66 | 9.47 | 4.87 | 5.02 | 0.021 | 0.00 | 0.002 | 0.05 | 3.19 | 0.00 | 0.097 | 0.000 | 0.010 | 0.00 |
| 162 | 63.07 | 10.55 | 11.38 | 5.31 | 5.99 | 0.023 | 0.00 | 0.021 | 0.05 | 3.48 | 0.00 | 0.105 | 0.000 | 0.020 | 0.00 |
| 163 | 63.03 | 10.54 | 11.37 | 5.31 | 5.99 | 0.023 | 0.00 | 0.021 | 0.10 | 3.48 | 0.00 | 0.105 | 0.000 | 0.030 | 0.00 |
| 164 | 67.15 | 9.61 | 9.42 | 4.84 | 4.99 | 0.021 | 0.00 | 0.019 | 0.05 | 3.85 | 0.00 | 0.000 | 0.000 | 0.000 | 0.00 |
| 165 | 67.12 | 9.61 | 9.42 | 4.84 | 4.99 | 0.021 | 0.00 | 0.019 | 0.05 | 3.84 | 0.00 | 0.000 | 0.000 | 0.000 | 0.00 |
| 166 | 66.86 | 9.57 | 9.38 | 4.82 | 4.97 | 0.021 | 0.00 | 0.019 | 0.05 | 3.83 | 0.00 | 0.000 | 0.000 | 0.000 | 0.00 |
| 167 | 67.13 | 9.61 | 9.42 | 4.84 | 4.99 | 0.021 | 0.02 | 0.019 | 0.05 | 3.84 | 0.00 | 0.048 | 0.000 | 0.000 | 0.00 |
| 168 | 67.10 | 9.61 | 9.41 | 4.84 | 4.99 | 0.021 | 0.02 | 0.019 | 0.05 | 3.84 | 0.00 | 0.096 | 0.000 | 0.000 | 0.00 |
| 169 | 66.85 | 9.57 | 9.38 | 4.82 | 4.97 | 0.020 | 0.02 | 0.019 | 0.05 | 3.83 | 0.00 | 0.478 | 0.000 | 0.000 | 0.00 |
| 170 | 66.99 | 9.59 | 9.40 | 4.83 | 4.98 | 0.021 | 0.00 | 0.019 | 0.05 | 3.64 | 0.00 | 0.479 | 0.000 | 0.000 | 0.00 |
| 171 | 67.05 | 9.60 | 9.41 | 4.84 | 4.99 | 0.021 | 0.00 | 0.019 | 0.05 | 3.65 | 0.00 | 0.384 | 0.000 | 0.000 | 0.00 |
| 172 | 67.12 | 9.61 | 9.42 | 4.84 | 4.99 | 0.021 | 0.00 | 0.019 | 0.05 | 3.65 | 0.00 | 0.288 | 0.000 | 0.000 | 0.00 |
| 173 | 67.12 | 9.61 | 9.42 | 4.84 | 4.99 | 0.021 | 0.00 | 0.019 | 0.05 | 3.46 | 0.00 | 0.480 | 0.000 | 0.000 | 0.00 |
| 174 | 67.18 | 9.62 | 9.42 | 4.85 | 5.00 | 0.021 | 0.00 | 0.019 | 0.05 | 3.46 | 0.00 | 0.385 | 0.000 | 0.000 | 0.00 |
| 175 | 67.25 | 9.63 | 9.43 | 4.85 | 5.00 | 0.021 | 0.00 | 0.019 | 0.05 | 3.47 | 0.00 | 0.289 | 0.000 | 0.000 | 0.00 |
| 176 | 67.06 | 9.60 | 9.41 | 4.84 | 4.99 | 0.021 | 0.00 | 0.002 | 0.05 | 3.65 | 0.00 | 0.384 | 0.000 | 0.000 | 0.00 |
| 177 | 67.19 | 9.62 | 9.43 | 4.85 | 5.00 | 0.021 | 0.00 | 0.002 | 0.05 | 3.46 | 0.00 | 0.385 | 0.000 | 0.000 | 0.00 |
| 178 | 67.32 | 9.64 | 9.44 | 4.86 | 5.01 | 0.021 | 0.00 | 0.002 | 0.05 | 3.28 | 0.00 | 0.385 | 0.000 | 0.000 | 0.00 |
| 179 | 66.86 | 9.57 | 9.38 | 4.82 | 4.97 | 0.021 | 0.00 | 0.019 | 0.05 | 3.83 | 0.00 | 0.383 | 0.000 | 0.000 | 0.00 |
| 180 | 66.80 | 9.56 | 9.37 | 4.82 | 4.97 | 0.020 | 0.00 | 0.019 | 0.05 | 3.82 | 0.00 | 0.382 | 0.000 | 0.000 | 0.00 |
| 181 | 66.87 | 9.57 | 9.38 | 4.82 | 4.97 | 0.021 | 0.00 | 0.003 | 0.05 | 3.83 | 0.00 | 0.383 | 0.000 | 0.000 | 0.00 |
| 182 | 66.74 | 9.55 | 9.36 | 4.81 | 4.96 | 0.020 | 0.00 | 0.003 | 0.05 | 3.82 | 0.00 | 0.478 | 0.000 | 0.000 | 0.00 |
| 183 | 66.97 | 9.59 | 9.39 | 4.83 | 4.98 | 0.021 | 0.00 | 0.003 | 0.05 | 3.64 | 0.00 | 0.383 | 0.000 | 0.000 | 0.00 |
| 184 | 67.13 | 9.61 | 9.42 | 4.84 | 4.99 | 0.021 | 0.00 | 0.002 | 0.05 | 3.56 | 0.00 | 0.288 | 0.000 | 0.000 | 0.00 |
| 185 | 67.19 | 9.62 | 9.43 | 4.85 | 5.00 | 0.021 | 0.00 | 0.002 | 0.05 | 3.56 | 0.00 | 0.192 | 0.000 | 0.000 | 0.00 |
| 186 | 67.26 | 9.63 | 9.44 | 4.85 | 5.00 | 0.021 | 0.00 | 0.002 | 0.05 | 3.56 | 0.00 | 0.096 | 0.000 | 0.000 | 0.00 |
| 187 | 67.21 | 9.62 | 9.43 | 4.85 | 5.00 | 0.021 | 0.00 | 0.002 | 0.05 | 3.56 | 0.00 | 0.192 | 0.000 | 0.000 | 0.00 |
| 188 | 67.18 | 9.62 | 9.42 | 4.85 | 5.00 | 0.021 | 0.00 | 0.002 | 0.05 | 3.56 | 0.00 | 0.192 | 0.000 | 0.000 | 0.00 |
| 189 | 67.26 | 9.63 | 9.44 | 4.85 | 5.00 | 0.021 | 0.00 | 0.002 | 0.05 | 3.37 | 0.00 | 0.289 | 0.000 | 0.000 | 0.00 |
| 190 | 67.32 | 9.64 | 9.44 | 4.86 | 5.01 | 0.021 | 0.00 | 0.002 | 0.05 | 3.37 | 0.00 | 0.193 | 0.000 | 0.000 | 0.00 |
| 191 | 67.39 | 9.65 | 9.45 | 4.86 | 5.01 | 0.021 | 0.00 | 0.002 | 0.05 | 3.38 | 0.00 | 0.096 | 0.000 | 0.000 | 0.00 |
| 192 | 67.13 | 9.61 | 9.42 | 4.84 | 4.99 | 0.021 | 0.00 | 0.002 | 0.05 | 3.65 | 0.00 | 0.192 | 0.000 | 0.000 | 0.00 |
| 193 | 67.32 | 9.64 | 9.44 | 4.86 | 5.01 | 0.021 | 0.00 | 0.002 | 0.05 | 3.47 | 0.00 | 0.096 | 0.000 | 0.000 | 0.00 |
| 194 | 67.11 | 9.61 | 9.42 | 4.84 | 4.99 | 0.021 | 0.00 | 0.002 | 0.05 | 3.36 | 0.00 | 0.192 | 0.000 | 0.000 | 0.00 |
| 195 | 66.87 | 9.57 | 9.38 | 4.82 | 4.97 | 0.021 | 0.00 | 0.003 | 0.05 | 3.35 | 0.00 | 0.191 | 0.000 | 0.000 | 0.00 |
| 196 | 66.84 | 9.57 | 9.38 | 4.82 | 4.97 | 0.021 | 0.00 | 0.003 | 0.05 | 3.35 | 0.00 | 0.191 | 0.000 | 0.000 | 0.00 |
| 197 | 66.77 | 9.56 | 9.37 | 4.82 | 4.97 | 0.021 | 0.00 | 0.003 | 0.05 | 3.35 | 0.00 | 0.191 | 0.000 | 0.000 | 0.00 |
| 198 | 66.80 | 9.56 | 9.37 | 4.82 | 4.97 | 0.021 | 0.00 | 0.003 | 0.14 | 3.35 | 0.00 | 0.191 | 0.000 | 0.000 | 0.00 |
| 199 | 66.84 | 9.57 | 9.38 | 4.82 | 4.97 | 0.021 | 0.00 | 0.003 | 0.05 | 3.35 | 0.00 | 0.191 | 0.000 | 0.000 | 0.00 |
| 200 | 67.18 | 9.62 | 9.42 | 4.85 | 5.00 | 0.021 | 0.00 | 0.002 | 0.05 | 3.37 | 0.00 | 0.192 | 0.000 | 0.000 | 0.00 |
| 201 | 67.01 | 9.59 | 9.40 | 4.83 | 4.98 | 0.021 | 0.00 | 0.002 | 0.05 | 3.36 | 0.00 | 0.192 | 0.000 | 0.000 | 0.00 |
| 202 | 66.69 | 9.55 | 9.36 | 4.81 | 4.96 | 0.021 | 0.00 | 0.002 | 0.05 | 3.34 | 0.00 | 0.191 | 0.000 | 0.000 | 0.00 |
| 203 | 67.47 | 9.66 | 9.47 | 4.87 | 5.02 | 0.021 | 0.00 | 0.002 | 0.05 | 3.28 | 0.00 | 0.097 | 0.000 | 0.000 | 0.00 |
| 204 | 67.45 | 9.66 | 9.46 | 4.87 | 5.02 | 0.021 | 0.00 | 0.002 | 0.05 | 3.28 | 0.00 | 0.097 | 0.000 | 0.000 | 0.00 |
| 205 | 67.53 | 9.67 | 9.47 | 4.87 | 5.02 | 0.021 | 0.00 | 0.002 | 0.05 | 3.19 | 0.00 | 0.097 | 0.000 | 0.000 | 0.00 |
| 206 | 67.52 | 9.67 | 9.47 | 4.87 | 5.02 | 0.021 | 0.00 | 0.002 | 0.05 | 3.19 | 0.00 | 0.097 | 0.000 | 0.000 | 0.00 |
| 207 | 67.66 | 9.69 | 9.49 | 4.88 | 5.03 | 0.021 | 0.00 | 0.002 | 0.05 | 3.00 | 0.00 | 0.097 | 0.000 | 0.000 | 0.00 |
| 208 | 67.65 | 9.68 | 9.49 | 4.88 | 5.03 | 0.021 | 0.00 | 0.002 | 0.05 | 3.00 | 0.00 | 0.097 | 0.000 | 0.000 | 0.00 |
| 209 | 67.55 | 9.67 | 9.48 | 4.87 | 5.02 | 0.021 | 0.00 | 0.002 | 0.05 | 3.19 | 0.00 | 0.048 | 0.000 | 0.000 | 0.00 |
| 210 | 67.48 | 9.66 | 9.47 | 4.87 | 5.02 | 0.021 | 0.00 | 0.002 | 0.05 | 3.19 | 0.00 | 0.145 | 0.000 | 0.000 | 0.00 |
| 211 | 67.35 | 9.64 | 9.45 | 4.86 | 5.01 | 0.021 | 0.00 | 0.002 | 0.05 | 3.37 | 0.00 | 0.193 | 0.000 | 0.000 | 0.00 |
| 212 | 67.36 | 9.64 | 9.45 | 4.86 | 5.01 | 0.021 | 0.00 | 0.002 | 0.05 | 3.38 | 0.00 | 0.193 | 0.000 | 0.000 | 0.00 |
| 213 | 67.35 | 9.64 | 9.45 | 4.86 | 5.01 | 0.021 | 0.00 | 0.024 | 0.05 | 3.37 | 0.00 | 0.193 | 0.000 | 0.000 | 0.00 |
| 214 | 67.13 | 9.61 | 9.42 | 4.84 | 4.99 | 0.021 | 0.00 | 0.002 | 0.05 | 3.56 | 0.00 | 0.384 | 0.000 | 0.000 | 0.00 |
| 215 | 67.10 | 9.61 | 9.41 | 4.84 | 4.99 | 0.021 | 0.00 | 0.002 | 0.05 | 3.55 | 0.00 | 0.384 | 0.000 | 0.000 | 0.00 |
| 216 | 63.69 | 10.64 | 10.43 | 5.36 | 5.53 | 0.023 | 0.00 | 0.021 | 0.05 | 3.83 | 0.00 | 0.426 | 0.000 | 0.000 | 0.00 |
| 217 | 66.45 | 9.62 | 9.42 | 6.73 | 3.84 | 0.036 | 0.00 | 0.019 | 0.05 | 3.46 | 0.00 | 0.385 | 0.000 | 0.000 | 0.00 |
| 218 | 63.62 | 10.63 | 10.42 | 5.36 | 5.52 | 0.023 | 0.00 | 0.021 | 0.05 | 3.93 | 0.00 | 0.425 | 0.000 | 0.000 | 0.00 |
| 219 | 63.55 | 10.62 | 10.41 | 5.35 | 5.52 | 0.023 | 0.00 | 0.021 | 0.05 | 4.03 | 0.00 | 0.425 | 0.000 | 0.000 | 0.00 |
| 220 | 63.25 | 10.57 | 10.36 | 5.59 | 5.49 | 0.024 | 0.00 | 0.021 | 0.05 | 4.23 | 0.00 | 0.423 | 0.000 | 0.000 | 0.00 |
| 221 | 61.37 | 11.19 | 10.96 | 5.64 | 5.81 | 0.024 | 0.00 | 0.022 | 0.06 | 4.48 | 0.00 | 0.448 | 0.000 | 0.000 | 0.00 |
| 222 | 61.58 | 11.23 | 11.00 | 5.66 | 5.83 | 0.024 | 0.00 | 0.022 | 0.06 | 4.15 | 0.00 | 0.449 | 0.000 | 0.000 | 0.00 |
| 223 | 61.51 | 11.21 | 10.99 | 5.65 | 5.83 | 0.024 | 0.00 | 0.022 | 0.06 | 4.26 | 0.00 | 0.449 | 0.000 | 0.000 | 0.00 |
| 224 | 63.48 | 10.61 | 10.39 | 5.61 | 5.51 | 0.024 | 0.00 | 0.021 | 0.05 | 3.98 | 0.00 | 0.318 | 0.000 | 0.000 | 0.00 |
| 225 | 63.42 | 10.60 | 10.38 | 5.60 | 5.51 | 0.024 | 0.00 | 0.021 | 0.05 | 3.97 | 0.00 | 0.424 | 0.000 | 0.000 | 0.00 |
| 226 | 63.36 | 10.59 | 10.37 | 4.29 | 6.43 | 0.395 | 0.00 | 0.218 | 0.05 | 3.97 | 0.00 | 0.318 | 0.000 | 0.000 | 0.00 |
| 227 | 63.29 | 10.57 | 10.36 | 4.29 | 6.43 | 0.395 | 0.00 | 0.218 | 0.05 | 3.97 | 0.00 | 0.423 | 0.000 | 0.000 | 0.00 |
| 228 | 62.74 | 10.48 | 11.32 | 4.25 | 6.53 | 0.246 | 0.00 | 0.133 | 0.05 | 3.93 | 0.00 | 0.314 | 0.000 | 0.000 | 0.00 |
| 229 | 62.63 | 10.46 | 11.30 | 4.25 | 6.52 | 0.308 | 0.00 | 0.133 | 0.05 | 3.92 | 0.00 | 0.419 | 0.000 | 0.000 | 0.00 |
| 230 | 62.88 | 10.51 | 11.35 | 5.29 | 5.98 | 0.023 | 0.00 | 0.021 | 0.05 | 3.57 | 0.00 | 0.315 | 0.000 | 0.000 | 0.00 |
| 231 | 62.69 | 10.47 | 11.31 | 5.28 | 5.97 | 0.022 | 0.00 | 0.021 | 0.05 | 3.88 | 0.00 | 0.314 | 0.000 | 0.000 | 0.00 |
| 232 | 64.74 | 9.98 | 10.78 | 5.03 | 5.69 | 0.021 | 0.00 | 0.020 | 0.05 | 3.39 | 0.00 | 0.299 | 0.000 | 0.000 | 0.00 |
| 233 | 64.54 | 9.95 | 10.75 | 5.01 | 5.67 | 0.021 | 0.00 | 0.020 | 0.05 | 3.68 | 0.00 | 0.299 | 0.000 | 0.000 | 0.00 |
| 234 | 62.82 | 10.50 | 11.34 | 5.29 | 5.98 | 0.023 | 0.00 | 0.021 | 0.05 | 3.78 | 0.00 | 0.210 | 0.000 | 0.000 | 0.00 |
| 235 | 62.75 | 10.48 | 11.32 | 5.28 | 5.97 | 0.023 | 0.00 | 0.021 | 0.05 | 3.88 | 0.00 | 0.210 | 0.000 | 0.000 | 0.00 |

TABLE 4-continued

| Ex. | SiO$_2$ | Al$_2$O$_3$ | B$_2$O$_3$ | Li$_2$O | Na$_2$O | K$_2$O | MgO | CaO | SnO$_2$ | WO$_3$ | MoO$_3$ | Ag | Au | V$_2$O$_5$ | F— |
|---|---|---|---|---|---|---|---|---|---|---|---|---|---|---|---|
| 236 | 63.05 | 10.53 | 11.38 | 5.31 | 6.00 | 0.023 | 0.00 | 0.021 | 0.05 | 3.48 | 0.00 | 0.158 | 0.000 | 0.000 | 0.00 |
| 237 | 63.08 | 10.54 | 11.38 | 5.31 | 6.00 | 0.023 | 0.00 | 0.021 | 0.05 | 3.48 | 0.00 | 0.105 | 0.000 | 0.000 | 0.00 |
| 238 | 63.25 | 10.57 | 11.41 | 5.32 | 6.02 | 0.023 | 0.00 | 0.021 | 0.05 | 3.17 | 0.00 | 0.159 | 0.000 | 0.000 | 0.00 |
| 239 | 63.28 | 10.57 | 11.42 | 5.33 | 6.02 | 0.023 | 0.00 | 0.021 | 0.05 | 3.17 | 0.00 | 0.106 | 0.000 | 0.000 | 0.00 |
| 240 | 62.98 | 10.52 | 11.36 | 5.30 | 5.99 | 0.023 | 0.00 | 0.021 | 0.05 | 3.58 | 0.00 | 0.158 | 0.000 | 0.000 | 0.00 |
| 241 | 62.95 | 10.52 | 11.36 | 5.30 | 5.99 | 0.023 | 0.00 | 0.021 | 0.05 | 3.58 | 0.00 | 0.210 | 0.000 | 0.000 | 0.00 |
| 242 | 63.52 | 10.61 | 10.40 | 5.61 | 5.51 | 0.024 | 0.00 | 0.021 | 0.05 | 3.98 | 0.00 | 0.265 | 0.000 | 0.000 | 0.00 |
| 243 | 63.59 | 10.62 | 10.41 | 5.62 | 5.52 | 0.024 | 0.00 | 0.021 | 0.05 | 3.88 | 0.00 | 0.266 | 0.000 | 0.000 | 0.00 |
| 244 | 63.65 | 10.63 | 10.42 | 5.62 | 5.53 | 0.024 | 0.00 | 0.021 | 0.05 | 3.78 | 0.00 | 0.266 | 0.000 | 0.000 | 0.00 |
| 245 | 62.85 | 10.50 | 11.34 | 5.55 | 5.46 | 0.024 | 0.00 | 0.021 | 0.05 | 3.94 | 0.00 | 0.262 | 0.000 | 0.000 | 0.00 |
| 246 | 62.92 | 10.51 | 11.35 | 5.56 | 5.46 | 0.024 | 0.00 | 0.021 | 0.05 | 3.84 | 0.00 | 0.263 | 0.000 | 0.000 | 0.00 |
| 247 | 62.98 | 10.52 | 11.36 | 5.56 | 5.47 | 0.024 | 0.00 | 0.021 | 0.05 | 3.74 | 0.00 | 0.263 | 0.000 | 0.000 | 0.00 |
| 248 | 63.02 | 10.53 | 11.37 | 5.30 | 6.00 | 0.023 | 0.00 | 0.021 | 0.05 | 3.58 | 0.00 | 0.105 | 0.000 | 0.000 | 0.00 |
| 249 | 63.00 | 10.53 | 11.37 | 5.30 | 6.00 | 0.023 | 0.00 | 0.021 | 0.05 | 3.58 | 0.00 | 0.132 | 0.000 | 0.000 | 0.00 |
| 250 | 63.09 | 10.54 | 11.38 | 5.31 | 6.00 | 0.023 | 0.00 | 0.021 | 0.05 | 3.48 | 0.00 | 0.098 | 0.000 | 0.000 | 0.00 |
| 251 | 63.10 | 10.54 | 11.38 | 5.31 | 6.00 | 0.023 | 0.00 | 0.021 | 0.05 | 3.48 | 0.00 | 0.087 | 0.000 | 0.000 | 0.00 |
| 252 | 63.12 | 10.55 | 11.39 | 5.31 | 6.01 | 0.023 | 0.00 | 0.021 | 0.00 | 3.48 | 0.00 | 0.105 | 0.000 | 0.000 | 0.00 |
| 253 | 63.05 | 10.53 | 11.38 | 5.31 | 6.00 | 0.023 | 0.00 | 0.021 | 0.11 | 3.48 | 0.00 | 0.105 | 0.000 | 0.000 | 0.00 |
| 254 | 63.08 | 10.54 | 11.38 | 5.31 | 6.00 | 0.023 | 0.00 | 0.021 | 0.05 | 3.48 | 0.00 | 0.105 | 0.000 | 0.000 | 0.00 |
| 255 | 63.05 | 10.53 | 11.38 | 5.31 | 6.00 | 0.023 | 0.00 | 0.021 | 0.05 | 3.53 | 0.00 | 0.105 | 0.000 | 0.000 | 0.00 |
| 256 | 58.65 | 11.42 | 13.33 | 5.71 | 6.98 | 0.024 | 0.00 | 0.020 | 0.10 | 3.61 | 0.00 | 0.150 | 0.000 | 0.000 | 0.00 |
| 257 | 57.15 | 11.42 | 14.34 | 5.71 | 7.48 | 0.024 | 0.00 | 0.020 | 0.10 | 3.61 | 0.00 | 0.150 | 0.000 | 0.000 | 0.00 |
| 258 | 55.64 | 11.42 | 15.34 | 5.71 | 7.98 | 0.024 | 0.00 | 0.020 | 0.10 | 3.61 | 0.00 | 0.150 | 0.000 | 0.000 | 0.00 |
| 259 | 58.92 | 11.39 | 12.80 | 5.70 | 6.71 | 0.024 | 0.00 | 0.200 | 0.10 | 4.00 | 0.00 | 0.150 | 0.000 | 0.000 | 0.00 |
| 260 | 58.17 | 11.39 | 13.30 | 5.70 | 6.96 | 0.024 | 0.00 | 0.200 | 0.10 | 4.00 | 0.00 | 0.150 | 0.000 | 0.000 | 0.00 |
| 261 | 58.27 | 9.74 | 10.52 | 4.91 | 5.54 | 0.021 | 0.00 | 0.019 | 0.10 | 3.40 | 0.00 | 0.103 | 0.000 | 0.000 | 7.39 |
| 262 | 56.48 | 11.06 | 12.91 | 5.53 | 6.76 | 0.023 | 0.00 | 0.194 | 0.10 | 3.88 | 0.00 | 0.146 | 0.000 | 0.000 | 2.91 |
| 263 | 54.88 | 10.75 | 12.55 | 5.38 | 6.57 | 0.023 | 0.00 | 0.189 | 0.09 | 3.77 | 0.00 | 0.142 | 0.000 | 0.000 | 5.66 |
| 264 | 56.02 | 10.97 | 12.81 | 5.49 | 6.70 | 0.023 | 0.00 | 0.193 | 0.10 | 3.85 | 0.00 | 0.144 | 0.000 | 0.000 | 3.70 |
| 265 | 54.01 | 10.58 | 12.35 | 5.29 | 6.46 | 0.022 | 0.00 | 0.186 | 0.09 | 3.71 | 0.00 | 0.139 | 0.000 | 0.000 | 7.15 |
| 266 | 55.65 | 10.90 | 12.73 | 5.45 | 6.66 | 0.023 | 0.00 | 0.191 | 0.10 | 3.64 | 0.00 | 0.127 | 0.000 | 0.000 | 4.54 |
| 267 | 55.15 | 10.80 | 12.61 | 5.40 | 6.60 | 0.023 | 0.00 | 0.190 | 0.09 | 3.60 | 0.00 | 0.126 | 0.000 | 0.000 | 5.40 |
| 268 | 56.39 | 11.04 | 12.89 | 5.52 | 6.75 | 0.023 | 0.00 | 0.194 | 0.10 | 3.25 | 0.00 | 0.122 | 0.000 | 0.000 | 3.72 |
| 269 | 56.36 | 11.04 | 12.89 | 5.52 | 6.74 | 0.023 | 0.00 | 0.194 | 0.10 | 3.29 | 0.00 | 0.124 | 0.000 | 0.000 | 3.72 |
| 270 | 56.33 | 11.03 | 12.88 | 5.52 | 6.74 | 0.023 | 0.00 | 0.194 | 0.10 | 3.34 | 0.00 | 0.125 | 0.000 | 0.000 | 3.72 |
| 271 | 56.30 | 11.03 | 12.87 | 5.52 | 6.74 | 0.023 | 0.00 | 0.194 | 0.10 | 3.39 | 0.00 | 0.127 | 0.000 | 0.000 | 3.72 |
| 272 | 56.27 | 11.02 | 12.87 | 5.51 | 6.73 | 0.023 | 0.00 | 0.194 | 0.10 | 3.43 | 0.00 | 0.129 | 0.000 | 0.000 | 3.71 |
| 273 | 56.24 | 11.01 | 12.86 | 5.51 | 6.73 | 0.023 | 0.00 | 0.193 | 0.10 | 3.48 | 0.00 | 0.131 | 0.000 | 0.000 | 3.71 |
| 274 | 56.30 | 11.03 | 12.87 | 5.52 | 6.74 | 0.023 | 0.00 | 0.194 | 0.15 | 3.34 | 0.00 | 0.125 | 0.000 | 0.000 | 3.72 |
| 275 | 56.27 | 11.02 | 12.87 | 5.51 | 6.73 | 0.023 | 0.00 | 0.194 | 0.19 | 3.34 | 0.00 | 0.125 | 0.000 | 0.000 | 3.72 |
| 276 | 56.79 | 11.12 | 12.99 | 5.56 | 6.80 | 0.024 | 0.00 | 0.195 | 0.10 | 3.37 | 0.00 | 0.126 | 0.000 | 0.000 | 2.93 |
| 277 | 56.76 | 11.12 | 12.98 | 5.56 | 6.79 | 0.024 | 0.00 | 0.195 | 0.15 | 3.37 | 0.00 | 0.126 | 0.000 | 0.000 | 2.93 |
| 278 | 56.74 | 11.11 | 12.97 | 5.56 | 6.79 | 0.024 | 0.00 | 0.195 | 0.20 | 3.37 | 0.00 | 0.126 | 0.000 | 0.000 | 2.93 |
| 279 | 56.80 | 11.12 | 12.99 | 5.57 | 6.76 | 0.000 | 0.00 | 0.195 | 0.15 | 3.37 | 0.00 | 0.126 | 0.000 | 0.000 | 2.93 |
| 280 | 56.39 | 11.04 | 12.89 | 5.53 | 6.75 | 0.023 | 0.00 | 0.194 | 0.19 | 3.15 | 0.00 | 0.118 | 0.000 | 0.000 | 3.72 |
| 281 | 56.33 | 11.03 | 12.88 | 5.52 | 6.74 | 0.023 | 0.00 | 0.194 | 0.19 | 3.24 | 0.00 | 0.122 | 0.000 | 0.000 | 3.72 |
| 282 | 55.42 | 10.85 | 12.67 | 5.43 | 6.63 | 0.023 | 0.00 | 0.191 | 0.14 | 3.10 | 0.00 | 0.116 | 0.000 | 0.000 | 5.43 |
| 283 | 55.36 | 10.84 | 12.66 | 5.42 | 6.63 | 0.023 | 0.00 | 0.190 | 0.14 | 3.19 | 0.00 | 0.120 | 0.000 | 0.000 | 5.43 |
| 284 | 66.86 | 9.57 | 9.38 | 4.82 | 4.97 | 0.020 | 0.00 | 0.019 | 0.05 | 2.87 | 0.96 | 0.479 | 0.000 | 0.000 | 0.00 |
| 285 | 66.86 | 9.57 | 9.38 | 4.82 | 4.97 | 0.020 | 0.00 | 0.019 | 0.05 | 2.87 | 0.96 | 0.383 | 0.000 | 0.000 | 0.00 |
| 286 | 66.86 | 9.57 | 9.38 | 4.82 | 4.97 | 0.021 | 0.00 | 0.019 | 0.05 | 1.91 | 1.91 | 0.479 | 0.000 | 0.000 | 0.00 |
| 287 | 66.86 | 9.57 | 9.38 | 4.82 | 4.97 | 0.021 | 0.00 | 0.019 | 0.05 | 1.91 | 1.91 | 0.383 | 0.000 | 0.000 | 0.00 |
| 288 | 63.06 | 10.54 | 11.38 | 5.31 | 5.99 | 0.023 | 0.00 | 0.021 | 0.11 | 1.74 | 1.74 | 0.105 | 0.000 | 0.000 | 0.00 |
| 289 | 54.41 | 10.75 | 12.55 | 5.38 | 6.57 | 0.023 | 0.00 | 0.189 | 0.09 | 2.83 | 1.42 | 0.142 | 0.000 | 0.000 | 5.66 |
| 290 | 63.15 | 10.55 | 11.39 | 5.32 | 6.01 | 0.023 | 0.00 | 0.021 | 0.05 | 3.48 | 0.00 | 0.000 | 0.003 | 0.000 | 0.00 |
| 291 | 63.15 | 10.55 | 11.39 | 5.32 | 6.01 | 0.023 | 0.00 | 0.021 | 0.05 | 3.48 | 0.00 | 0.000 | 0.006 | 0.000 | 0.00 |
| 292 | 63.14 | 10.55 | 11.39 | 5.32 | 6.01 | 0.023 | 0.00 | 0.021 | 0.05 | 3.48 | 0.00 | 0.000 | 0.013 | 0.000 | 0.00 |
| 293 | 63.09 | 10.54 | 11.38 | 5.31 | 6.00 | 0.023 | 0.00 | 0.021 | 0.05 | 3.48 | 0.00 | 0.087 | 0.003 | 0.000 | 0.00 |
| 294 | 63.09 | 10.54 | 11.38 | 5.31 | 6.00 | 0.023 | 0.00 | 0.021 | 0.05 | 3.48 | 0.00 | 0.087 | 0.006 | 0.000 | 0.00 |
| 295 | 63.09 | 10.54 | 11.38 | 5.31 | 6.00 | 0.023 | 0.00 | 0.021 | 0.05 | 3.48 | 0.00 | 0.088 | 0.013 | 0.000 | 0.00 |
| 296 | 63.86 | 10.67 | 10.46 | 5.64 | 5.54 | 0.024 | 0.00 | 0.021 | 0.05 | 3.63 | 0.00 | 0.099 | 0.003 | 0.000 | 0.00 |
| 297 | 63.86 | 10.67 | 10.46 | 5.64 | 5.54 | 0.024 | 0.00 | 0.021 | 0.05 | 3.63 | 0.00 | 0.099 | 0.006 | 0.000 | 0.00 |
| 298 | 63.85 | 10.67 | 10.46 | 5.64 | 5.54 | 0.024 | 0.00 | 0.021 | 0.05 | 3.63 | 0.00 | 0.099 | 0.013 | 0.000 | 0.00 |
| 299 | 63.05 | 10.53 | 11.38 | 5.31 | 6.00 | 0.023 | 0.00 | 0.021 | 0.11 | 3.48 | 0.00 | 0.105 | 0.003 | 0.000 | 0.00 |
| 300 | 62.92 | 10.51 | 11.35 | 5.30 | 5.99 | 0.023 | 0.00 | 0.021 | 0.21 | 3.57 | 0.00 | 0.105 | 0.003 | 0.000 | 0.00 |
| 301 | 63.86 | 10.67 | 10.46 | 5.64 | 5.54 | 0.024 | 0.00 | 0.021 | 0.05 | 3.63 | 0.00 | 0.099 | 0.002 | 0.000 | 0.00 |
| 302 | 63.86 | 10.67 | 10.46 | 5.64 | 5.54 | 0.024 | 0.00 | 0.021 | 0.05 | 3.63 | 0.00 | 0.099 | 0.001 | 0.000 | 0.00 |
| 303 | 63.52 | 10.61 | 10.40 | 5.61 | 5.51 | 0.024 | 0.00 | 0.021 | 0.05 | 4.24 | 0.00 | 0.000 | 0.003 | 0.000 | 0.00 |
| 304 | 63.43 | 10.60 | 10.38 | 5.60 | 5.51 | 0.024 | 0.00 | 0.021 | 0.05 | 4.24 | 0.00 | 0.000 | 0.003 | 0.000 | 0.00 |
| 305 | 63.33 | 10.58 | 10.37 | 5.60 | 5.50 | 0.024 | 0.00 | 0.021 | 0.05 | 4.23 | 0.00 | 0.000 | 0.003 | 0.000 | 0.00 |
| 306 | 63.30 | 10.58 | 10.36 | 5.59 | 5.50 | 0.024 | 0.00 | 0.021 | 0.11 | 4.23 | 0.00 | 0.000 | 0.003 | 0.000 | 0.00 |
| 307 | 61.56 | 10.28 | 10.08 | 5.44 | 5.35 | 0.023 | 0.00 | 0.021 | 0.05 | 4.11 | 0.00 | 0.000 | 0.003 | 0.000 | 3.09 |
| 308 | 61.49 | 10.27 | 10.07 | 5.43 | 5.34 | 0.023 | 0.00 | 0.021 | 0.05 | 4.11 | 0.00 | 0.113 | 0.003 | 0.000 | 3.08 |
| 309 | 63.51 | 10.61 | 10.40 | 5.61 | 5.52 | 0.024 | 0.00 | 0.021 | 0.05 | 3.18 | 1.06 | 0.000 | 0.003 | 0.000 | 0.00 |
| 310 | 61.56 | 10.28 | 10.08 | 5.44 | 5.35 | 0.023 | 0.00 | 0.021 | 0.05 | 3.09 | 1.03 | 0.000 | 0.003 | 0.000 | 3.09 |
| 311 | 61.49 | 10.27 | 10.07 | 5.43 | 5.34 | 0.023 | 0.00 | 0.020 | 0.05 | 3.08 | 1.03 | 0.113 | 0.003 | 0.000 | 3.08 |

Referring now to Table 5, the article may have $SiO_2$ from about 60.01 mol % to about 77.94 mol %, $Al_2O_3$ from about 0.3 mol % to about 10.00 mol %, $B_2O_3$ from about 10 mol % to about 20 mol %, $R_2O$ from about 0.66 mol % to about 10 mol %, $WO_3$ from about 1.0 mol % to about 6.6 mol % and $SnO_2$ from about 0.0 mol % to about 0.1 mol %. It will be understood that any of the exemplary compositions of Table 5 may include $Sb_2O_3$ from about 0 mol % to about 0.09 mol %. The compositions of Table 5 are provided in an as-batched state within a crucible.

TABLE 5

| Ex. | $SiO_2$ | $Al_2O_3$ | $B_2O_3$ | $Li_2O$ | $Cs_2O$ | $SnO_2$ | $WO_3$ |
|---|---|---|---|---|---|---|---|
| 312 | 77.94 | 0.30 | 20.00 | 0.00 | 0.66 | 0.10 | 1.00 |
| 313 | 72.30 | 3.30 | 20.00 | 0.00 | 3.30 | 0.10 | 1.00 |
| 314 | 65.70 | 6.60 | 20.00 | 0.00 | 6.60 | 0.10 | 1.00 |
| 315 | 64.70 | 6.60 | 20.00 | 0.00 | 6.60 | 0.10 | 2.00 |
| 316 | 63.70 | 6.60 | 20.00 | 0.00 | 6.60 | 0.10 | 3.00 |
| 317 | 65.70 | 5.60 | 20.00 | 0.00 | 7.60 | 0.10 | 1.00 |
| 318 | 65.70 | 4.60 | 20.00 | 0.00 | 8.60 | 0.10 | 1.00 |
| 319 | 63.70 | 4.60 | 20.00 | 0.00 | 8.60 | 0.10 | 3.00 |
| 320 | 64.20 | 8.10 | 20.00 | 0.00 | 6.60 | 0.10 | 1.00 |
| 321 | 62.70 | 9.60 | 20.00 | 0.00 | 6.60 | 0.10 | 1.00 |
| 322 | 62.20 | 8.10 | 20.00 | 0.00 | 6.60 | 0.10 | 3.00 |
| 323 | 60.70 | 9.60 | 20.00 | 0.00 | 6.60 | 0.10 | 3.00 |
| 324 | 60.10 | 6.60 | 20.00 | 0.00 | 6.60 | 0.10 | 6.60 |
| 325 | 66.90 | 9.00 | 20.00 | 3.00 | 0.00 | 0.10 | 1.00 |
| 326 | 67.90 | 10.00 | 10.00 | 8.00 | 0.00 | 0.10 | 4.00 |
| 327 | 65.90 | 10.00 | 10.00 | 10.00 | 0.00 | 0.10 | 4.00 |
| 328 | 65.91 | 9.00 | 20.00 | 3.00 | 0.00 | 0.00 | 2.00 |

Referring now to Table 6, provided are a list of comparative exemplary glass compositions that, when melted using unbound alkali batch materials (e.g., alkali carbonates) instead of bound alkalis (e.g., nepheline), form a liquid alkali tungstate which separates during the melting process. As explained above, the second, liquid, alkali tungstate phase may solidify as a separate crystal which may opalize substrates manufactured therefrom.

TABLE 6

| Ex. | $SiO_2$ | $Al_2O_3$ | $B_2O_3$ | $Li_2O$ | $Na_2O$ | $K_2O$ | $Cs_2O$ | CaO | $SnO_2$ | $WO_3$ | $P_2O_5$ | Ag |
|---|---|---|---|---|---|---|---|---|---|---|---|---|
| 1 | 77.90 | 0.00 | 18.00 | 0.00 | 0.00 | 0.00 | 1.00 | 0.00 | 0.10 | 3.00 | 0.00 | 0.00 |
| 2 | 76.90 | 0.00 | 18.00 | 0.00 | 0.00 | 0.00 | 2.00 | 0.00 | 0.10 | 3.00 | 0.00 | 0.00 |
| 3 | 75.90 | 0.00 | 18.00 | 0.00 | 0.00 | 0.00 | 3.00 | 0.00 | 0.10 | 3.00 | 0.00 | 0.00 |
| 4 | 74.90 | 2.00 | 17.00 | 0.00 | 0.00 | 0.00 | 3.00 | 0.00 | 0.10 | 3.00 | 0.00 | 0.00 |
| 5 | 74.38 | 0.00 | 18.85 | 0.00 | 0.00 | 0.00 | 1.67 | 0.00 | 0.10 | 5.00 | 0.00 | 0.00 |
| 6 | 77.90 | 0.00 | 18.00 | 0.50 | 0.00 | 0.00 | 0.50 | 0.00 | 0.10 | 3.00 | 0.00 | 0.00 |
| 7 | 63.70 | 4.60 | 20.00 | 0.00 | 0.00 | 0.00 | 8.60 | 0.00 | 0.10 | 3.00 | 0.00 | 0.00 |
| 8 | 63.90 | 3.00 | 20.00 | 0.00 | 0.00 | 0.00 | 9.00 | 0.00 | 0.10 | 4.00 | 0.00 | 0.00 |
| 9 | 68.73 | 9.80 | 8.18 | 0.00 | 8.99 | 2.21 | 0.00 | 0.01 | 0.10 | 1.96 | 0.00 | 0.00 |
| 10 | 67.41 | 9.61 | 8.03 | 0.00 | 8.82 | 2.16 | 0.00 | 0.01 | 0.10 | 3.85 | 0.00 | 0.00 |
| 11 | 66.14 | 9.43 | 7.88 | 0.00 | 8.65 | 2.12 | 0.00 | 0.01 | 0.09 | 5.66 | 0.00 | 0.00 |
| 12 | 67.41 | 9.61 | 8.99 | 0.00 | 8.34 | 1.68 | 0.00 | 0.01 | 0.10 | 3.85 | 0.00 | 0.00 |
| 13 | 64.49 | 12.12 | 6.83 | 4.91 | 6.43 | 1.25 | 0.00 | 0.01 | 0.10 | 3.85 | 0.00 | 0.00 |
| 14 | 65.45 | 9.61 | 9.42 | 6.51 | 5.01 | 0.03 | 0.00 | 0.08 | 0.05 | 3.84 | 0.00 | 0.00 |
| 15 | 64.01 | 10.57 | 9.42 | 6.98 | 5.01 | 0.03 | 0.00 | 0.08 | 0.05 | 3.84 | 0.00 | 0.00 |
| 16 | 63.53 | 10.57 | 9.42 | 7.46 | 5.02 | 0.03 | 0.00 | 0.08 | 0.05 | 3.84 | 0.00 | 0.00 |
| 17 | 69.13 | 7.69 | 9.42 | 4.63 | 4.98 | 0.02 | 0.00 | 0.00 | 0.05 | 3.85 | 0.24 | 0.00 |
| 18 | 67.86 | 7.77 | 9.51 | 4.67 | 5.03 | 0.02 | 0.00 | 0.00 | 0.05 | 3.88 | 1.21 | 0.00 |
| 19 | 57.48 | 9.60 | 10.37 | 4.84 | 5.46 | 0.02 | 0.00 | 1.39 | 0.10 | 3.35 | 0.00 | 0.10 |
| 20 | 57.34 | 9.73 | 10.51 | 5.83 | 5.54 | 0.02 | 0.00 | 0.02 | 0.10 | 3.40 | 0.00 | 0.10 |
| 21 | 56.41 | 9.73 | 10.51 | 6.75 | 5.55 | 0.03 | 0.00 | 0.02 | 0.10 | 3.40 | 0.00 | 0.10 |
| 22 | 55.62 | 9.42 | 10.18 | 4.75 | 5.80 | 0.16 | 0.00 | 0.03 | 0.09 | 3.29 | 0.00 | 0.10 |
| 23 | 55.04 | 9.42 | 10.18 | 4.75 | 6.25 | 0.30 | 0.00 | 0.03 | 0.09 | 3.29 | 0.00 | 0.10 |

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and, further, it is to be understood that such concepts are intended to be covered by the following claims, unless these claims, by their language, expressly state otherwise. Further, the claims, as set forth below, are incorporated into and constitute part of this Detailed Description.

What is claimed is:

1. A glass-ceramic, comprising:
    an amorphous phase comprising a silicate glass; and
    a crystalline phase comprising precipitates of formula $M_xWO_3$ and/or $M_xMoO_3$, where $0<x<1$ and M is a dopant cation.

2. The glass-ceramic of claim 1, wherein the precipitates have a length of from about 1 nm to about 200 nm as measured by Electron Microscopy.

3. The glass-ceramic of claim 1, wherein the precipitates of the crystalline phase are homogenously distributed within the glass-ceramic.

4. The glass-ceramic of claim 1, wherein the glass-ceramic has transmittance of about 5%/mm or greater over at least one 50 nm-wide wavelength band of light in a range from about 400 nm to about 700 nm.

5. The glass-ceramic of claim 1, wherein the dopant cation is H, Li, Na, K, Rb, Cs, Ca, Sr, Ba, Zn, Ag, Au, Cu, Sn, Cd, In, Tl, Pb, Bi, Th, La, Pr, Nd, Sm, Eu, Gd, Dy, Ho, Er, Tm, Yb, Lu, U, Ti, V, Cr, Mn, Fe, Ni, Cu, Pd, Se, Ta, Bi, and/or Ce.

6. The glass-ceramic of claim 1, wherein at least some of the precipitates are at a depth of greater than about 10 μm from a surface of the glass-ceramic.

7. The glass-ceramic of claim 1, wherein the precipitates have a rod or needle morphology.

8. The glass-ceramic of claim 1, wherein volume fraction of the crystalline phase in the glass-ceramic is from about 0.001% to about 20%.

9. A glass-ceramic, comprising:
an amorphous phase comprising a silicate glass; and
a crystalline phase of formula $M_xWO_3$ and/or $M_xMoO_3$, where $0<x<1$ and M is a dopant cation, wherein volume fraction of the crystalline phase in the glass-ceramic is from about 0.001% to about 20%,
wherein the precipitates have a rod or needle morphology, and
wherein the precipitates have a length of from about 1 nm to about 200 nm as measured by Electron Microscopy,
wherein the precipitates are homogenously distributed within the glass-ceramic such that the precipitates of the crystalline phase of formula $M_xWO_3$ and/or $M_xMoO_3$ are present from a surface of the glass-ceramic and throughout a bulk of the glass-ceramic.

10. The glass-ceramic of claim 9, having transmittance of about 1%/mm or greater over at least one 50 nm-wide wavelength band of light in a range from about 400 nm to about 700 nm.

11. The glass-ceramic of claim 10, having absorption of at least 90%/mm for light in at least one 50 nm-wide wavelength band of light in the ultraviolet region of the spectrum.

12. The glass-ceramic of claim 10, having absorption of at least 90%/mm for light in at least one 50 nm-wide wavelength band of light in the near-infrared region of the spectrum.

13. A glass-ceramic, comprising:
an amorphous phase comprising a silicate glass; and
a crystalline phase comprising precipitates of formula $M_xWO_3$ and/or $M_xMoO_3$, where $0<x<1$ and M is an alkali metal cation.

14. The glass-ceramic of claim 13, wherein the precipitates have a length of from about 1 nm to about 200 nm as measured by Electron Microscopy.

15. The glass-ceramic of claim 13, wherein the precipitates are homogenously distributed within the glass-ceramic such that the precipitates of the crystalline phase of formula $M_xWO_3$ and/or $M_xMoO_3$ are present from a surface of the glass-ceramic and throughout a bulk of the glass-ceramic.

16. The glass-ceramic of claim 13, wherein the precipitates have a rod or needle morphology.

17. The glass-ceramic of claim 13, wherein volume fraction of the crystalline phase in the glass-ceramic is from about 0.001% to about 20%.

18. The glass-ceramic of claim 13, wherein the glass-ceramic has transmittance of about 1%/mm or greater over at least one 50 nm-wide wavelength band of light in a range from about 400 nm to about 700 nm.

19. The glass-ceramic of claim 18, having absorption of at least 90%/mm for light in at least one 50 nm-wide wavelength band of light in the ultraviolet region of the spectrum.

20. The glass-ceramic of claim 18, having absorption of at least 90%/mm for light in at least one 50 nm-wide wavelength band of light in the near-infrared region of the spectrum.

* * * * *

UNITED STATES PATENT AND TRADEMARK OFFICE
CERTIFICATE OF CORRECTION

PATENT NO.        : 10,807,906 B2
APPLICATION NO.   : 16/404783
DATED             : October 20, 2020
INVENTOR(S)       : Matthew John Dejneka et al.

Page 1 of 2

It is certified that error appears in the above-identified patent and that said Letters Patent is hereby corrected as shown below:

On the Title Page

In Column 2, item (56), Other Publications, Line 5, delete "Effucient" and insert -- Efficient --, therefor.

In Column 2, item (56), Other Publications, Line 10, delete "tiles" and insert -- files --, therefor.

On page 2, in Column 1, item (56), Other Publications, Line 13, delete "Forcast" and insert -- Forecast --, therefor.

On page 2, in Column 2, item (56), Other Publications, Line 7, delete "Nanoschale" and insert -- Nanoscale --, therefor.

On page 2, in Column 2, item (56), Other Publications, Line 26, delete "oxyflouride" and insert -- oxyfluoride --, therefor.

On page 2, in Column 2, item (56), Other Publications, Line 26, delete "Bulliten," and insert -- Bulletin, --, therefor.

On page 2, in Column 2, item (56), Other Publications, Line 44, delete "Reqeust" and insert -- Request --, therefor.

On page 2, in Column 2, item (56), Other Publications, Line 46, delete "RoH" and insert -- RoHS --, therefor.

On page 3, in Column 1, item (56), Other Publications, Line 24, delete "Quarternary" and insert -- Quaternary --, therefor.

On page 3, in Column 1, item (56), Other Publications, Line 25, delete "Nanopartice" and insert -- Nanoparticle --, therefor.

Signed and Sealed this
Twenty-sixth Day of January, 2021

Drew Hirshfeld
*Performing the Functions and Duties of the
Under Secretary of Commerce for Intellectual Property and
Director of the United States Patent and Trademark Office*

CERTIFICATE OF CORRECTION (continued)
U.S. Pat. No. 10,807,906 B2

On page 3, in Column 1, item (56), Other Publications, Line 50, delete "Oxude" and insert -- Oxide --, therefor.

On page 3, in Column 1, item (56), Other Publications, Line 52, delete "Enginnering," and insert -- Engineering, --, therefor.

On page 3, in Column 2, item (56), Other Publications, Line 5, delete "Systhesis" and insert -- Synthesis --, therefor.

On page 3, in Column 2, item (56), Other Publications, Line 12, delete "Borosilcate" and insert -- Borosilicate --, therefor.

On page 3, in Column 2, item (56), Other Publications, Line 21, delete "6(5." and insert -- 6(5). --, therefor.

On page 3, in Column 2, item (56), Other Publications, Line 38, delete "sheilding" and insert -- shielding --, therefor.

On page 3, in Column 2, item (56), Other Publications, Line 39, delete "photocromic" and insert -- photochromic --, therefor.

On page 3, in Column 2, item (56), Other Publications, Line 47, delete "Industires," and insert -- Industries, --, therefor.